DRIVE MECHANISM FOR TRANSPORTATION SYSTEMS

Filed Nov. 6, 1951 14 Sheets-Sheet 1

LESTER ROY BELLAH,
ROSS E. BELLAH, &
WILLIAM H. BELLAH,
INVENTORS.
BY
W E Beatty
Attorney April 6, 1954 L. R. BELLAH ET AL 2,674,203

DRIVE MECHANISM FOR TRANSPORTATION SYSTEMS

Filed Nov. 6, 1951 14 Sheets-Sheet 2

LESTER ROY BELLAH,
ROSS E. BELLAH, &
WILLIAM H. BELLAH,
INVENTORS.

BY W. E. Beatty
Attorney

LESTER ROY BELLAH,
ROSS E. BELLAH &
WILLIAM H. BELLAH,
INVENTORS.
BY
W E Beatty
ATTORNEY.

DRIVE MECHANISM FOR TRANSPORTATION SYSTEMS

Filed Nov. 6, 1951 14 Sheets-Sheet 4

LESTER ROY BELLAH,
ROSS E. BELLAH &
WILLIAM H. BELLAH,
INVENTORS.
BY
W. E. Beatty
Attorney April 6, 1954 L. R. BELLAH ET AL 2,674,203

DRIVE MECHANISM FOR TRANSPORTATION SYSTEMS

Filed Nov. 6, 1951 14 Sheets-Sheet 5

LESTER ROY BELLAH,
ROSS E. BELLAH &
WILLIAM H. BELLAH,
INVENTORS.

BY W. E. Beatty
Attorney

DRIVE MECHANISM FOR TRANSPORTATION SYSTEMS

Filed Nov. 6, 1951 14 Sheets-Sheet 6

LESTER ROY BELLAH,
ROSS E. BELLAH &
WILLIAM H. BELLAH,
INVENTORS.

BY W. E. Beatty
Attorney

LESTER ROY BELLAH,
ROSS E. BELLAH &
WILLIAM H. BELLAH,
INVENTORS.

BY W E Beatty
Attorney

LESTER ROY BELLAH,
ROSS E. BELLAH, &
WILLIAM H. BELLAH,
INVENTORS.
BY W E Beatty
Attorney

LESTER ROY BELLAH,
ROSS E. BELLAH &
WILLIAM H. BELLAH,
INVENTORS.

BY W E Beatty
Attorney

LESTER ROY BELLAH,
ROSS E. BELLAH &
WILLIAM H. BELLAH,
INVENTORS.
BY W E Beatty
Attorney

DRIVE MECHANISM FOR TRANSPORTATION SYSTEMS

Filed Nov. 6, 1951 14 Sheets-Sheet 11

LESTER ROY BELLAH,
ROSS E. BELLAH &
WILLIAM H. BELLAH,
INVENTORS.

BY W. E. Beatty
Attorney

LESTER ROY BELLAH,
ROSS E. BELLAH &
WILLIAM H. BELLAH,
INVENTORS.
BY W. E. Beatty
ATTORNEY.

LESTER ROY BELLAH,
ROSS E. BELLAH &
WILLIAM H. BELLAH,
INVENTORS.
BY
W E Beatty
ATTORNEY.

LESTER ROY BELLAH,
ROSS E. BELLAH &
WILLIAM H. BELLAH,
INVENTORS.

BY W. E. Beatty
ATTORNEY.

UNITED STATES PATENT OFFICE 2,674,203

DRIVE MECHANISM FOR TRANSPORTATION SYSTEMS

Lester R. Bellah and Ross E. Bellah, North Hollywood, and William H. Bellah, Hermosa Beach, Calif.

Application November 6, 1951, Serial No. 255,122

18 Claims. (Cl. 105—49)

The invention relates to a drive mechanism for a transportation system for transporting articles such as supplies between a supply station and one or more service stations. While the invention will be described particularly in connection with a restaurant for transporting trays with or without food between the kitchen and one or more customers in the restaurant, the invention may be employed in other situations and for handling other types of goods.

The invention provides an economy of manufacture and also repair by providing a transportation system in the form of a plurality of individual units, of which certain units are identical, whereby these units can be readily placed together to form a line of units in a desired shape or the units may be individually removed for ease of installation or repair.

It has heretofore been proposed to provide a transportation system having a track or endless belt for transporting food from a kitchen to various customers and for returning the tray to the kitchen, either initially with the order thereon or later with the empty dishes thereon, to the kitchen. The present invention provides a greater economy of time than prior systems of which we are aware, by the provision of an upper track leading from the kitchen to the restaurant, connected with a lower track which returns to the kitchen, with a service unit at each customer's position having an elevator for lifting the carrier and tray from the upper track to a position accessible to the customer, while holding up the passage of other carts and trays on the upper trackway to more distant stations only during the interval that the elevator in question is lifting the cart and tray from the upper track to the customer's position, or lowering the cart and tray from such position to the upper trackway. The invention prevents interference between an elevator in motion at existing stations and an oncoming cart or tray by the use of a block electrical system jointly controlled by the carts in their passage on the upper trackway and by the elevator at each station. The terms cart, carrier and carriage are synonymous.

In order to make it possible for one or more carts and trays to pass along the upper trackway to more distant stations while the elevator at a given station is in its elevated station, the invention provides an elevator to lift or lower the wanted cart with respect to the upper trackway and an elevated position viz. the customer's position, the elevator having a width greater than that of the cart and tray, the block system being cleared when the elevator is in its raised or lowered position so that thereafter one or more other carts with their trays can pass through a given elevator and reach their destinations at other customers' positions.

As applied to a restaurant, the present invention has the advantage that a customer seated remotely from the kitchen receives his food and service in the same time as other customers seated closer to the kitchen. The reason for this is that the present invention provides a line of service units and this line forms a complete circuit into which each customer's position leads, the length of the circuit from each customer's position to the kitchen and back to that customer being the same for all the customers.

The invention also provides an improved device for causing each cart and tray to return to its home position, i. e. the customer's position. This is accomplished by providing a counting or index device on each cart and by providing an actuating device therefor at each customer's position. The passage of a cart past each customer's position actuates the counting device until it reaches its home position. Thereafter, the elevator raises the tray to a position accessible to the customer.

As applied to restaurant service, the invention provides an improved cone drive giving an economy of time through making it possible to cause the carts to travel along the track at comparatively high speed viz. 200 feet per minute, and smoothly come to a stop in a short distance viz. 18 inches, or accelerate from rest to that high speed, without spilling liquid such as a cup of coffee, glass of water or the like. Smooth starting and stopping are accomplished not only as applied to the raising and lowering of the elevator, but also to the start and stop of a cart upon entering or leaving the desired elevator from the upper trackway. The devices herein shown and described in detail, for accelerating from rest to normal speed and for decelerating from normal speed to rest, have been constructed and tested and found to operate without spilling a soup bowl, a glass full of water, with a track speed of 200 feet per minute. However, the drive cones in the test unit were at the front of the cart, instead of at the middle therefore shown in Figs. 6 and 7. At such high speeds, the momentum is substantial and increases with an increase in the load on the cart. The invention takes this into account and provides substantially uniform smooth stopping of the cart regardless of the amount of load, by employing on the cart rubber tires of such a nature that the surface contact between the tires and the track increases with the load, thereby increasing the drag. Similar grooved rollers are employed in the elevator and they are conducive to quiet operation not only at the travel of the cart along the track but also to the operation of the elevator.

This application is a continuation-in-part of abandoned application S. N. 65,592, filed December 16, 1948, for "Article Carriage."

The transportation system disclosed herein is disclosed and claimed in application S. N. 153,337, filed April 1, 1950, for Transportation System.

In order to facilitate understanding of the invention, reference will be had to the appended drawings, in which:

Fig. 2 is a sectional side elevation taken along the line II—II of Fig. 3, showing a pair of stations with the tray carrier elevator in two of its positions.

Fig. 3 is a sectional view taken along the line III—III of Fig. 2.

Fig. 4 is a fragmentary view illustrating details of the cover latch and switch.

Fig. 5 is a fragmentary view showing a modification of the hood or closure illustrated in Fig. 3.

Fig. 6 is an enlarged horizontal section taken along the plane VI—VI of Fig. 2 showing a tray and carrier partly broken away.

Fig. 7 is a longitudinal section of the carrier taken along the line VII—VII of Fig. 6.

Fig. 8 is a transverse section taken along the line VIII—VIII of Fig. 6.

Fig. 9 is an enlarged transverse section taken along the line IX—IX of Fig. 6, illustrating the trigger and rail switch details.

Fig. 10 is a plan view taken along the line X—X of Fig. 9.

Fig. 11 is the same as Fig. 9 but with the carrier shown in section depressing the trigger and rail switch.

Fig. 12 is a sectional view taken along the line XII—XII of Fig. 9.

Fig. 13 is a sectional view taken along the line XIII—XIII of Fig. 2 showing the elevator drive mechanism.

Fig. 14 is a sectional view taken along the line XIV—XIV of Fig. 13.

Fig. 15 is a sectional view taken along the line XV—XV of Fig. 13.

Fig. 16 is a view similar to Fig. 2 showing a lowering unit for lowering the carriers from an upper to a lower trackway.

Fig. 17 is a view taken along the line XVII—XVII of Fig. 16.

Fig. 18 is a view taken along the line XVIII—XVIII of Fig. 16.

Fig. 19 is a view similar to Fig. 2 showing a turntable unit for converging lines of units to one supply station.

Fig. 20 is a sectional view taken along the line XX—XX of Fig. 19.

Fig. 21 is a view similar to Fig. 2 illustrating an end elevator unit for raising carriers from a lower to an upper trackway.

Fig. 22 is a sectional view taken along the line XXII—XXII of Fig. 21 with the carrier removed.

Fig. 23 is a sectional view taken along the line XXIII—XXIII of Fig. 21 with the carrier removed and parts thereof shown in dotted lines.

Fig. 24 is a schematic wiring diagram of the rear line of units in Fig. 1 with the turntable unit omitted and with the duplication of units reduced to the minimum required for the explanation of the electrical system.

Fig. 25 is an isometric wiring diagram of a turntable unit including the effected parts to show their relative position and function.

Fig. 26 is a modification of a detail embodied in the invention.

Fig. 27 is a sectional view taken along the line XXVII—XXVII of Fig. 26.

Fig. 28 is a schematic view showing how to arrange Figs. 16, 2, 19 and 21 in that order, to show the rear line of units in Fig. 1, units 1, 2, 3, etc.

Fig. 29 is a horizontal sectional view of the top of a service unit taken along the line XXIX—XXIX of Fig. 3.

Fig. 30 is a sectional view of a rail switch on the line XXX—XXX in Fig. 10.

Fig. 31 is a view like Fig. 4 with the hood unlatched.

Fig. 32 is a perspective view of the elevator mechanism and cover latch of a service unit. The frame and covers being shown in broken lines and with the carrier omitted.

Fig. 33 is an isometric view of pertinent parts of a turntable to show drive rail reset cam, and alternate position of certain parts being shown in broken lines.

Fig. 34 is a vertical sectional view of a modified form of carriage wheel.

Fig. 35 is a horizontal sectional view of preferred elevator roller.

Figure 1:
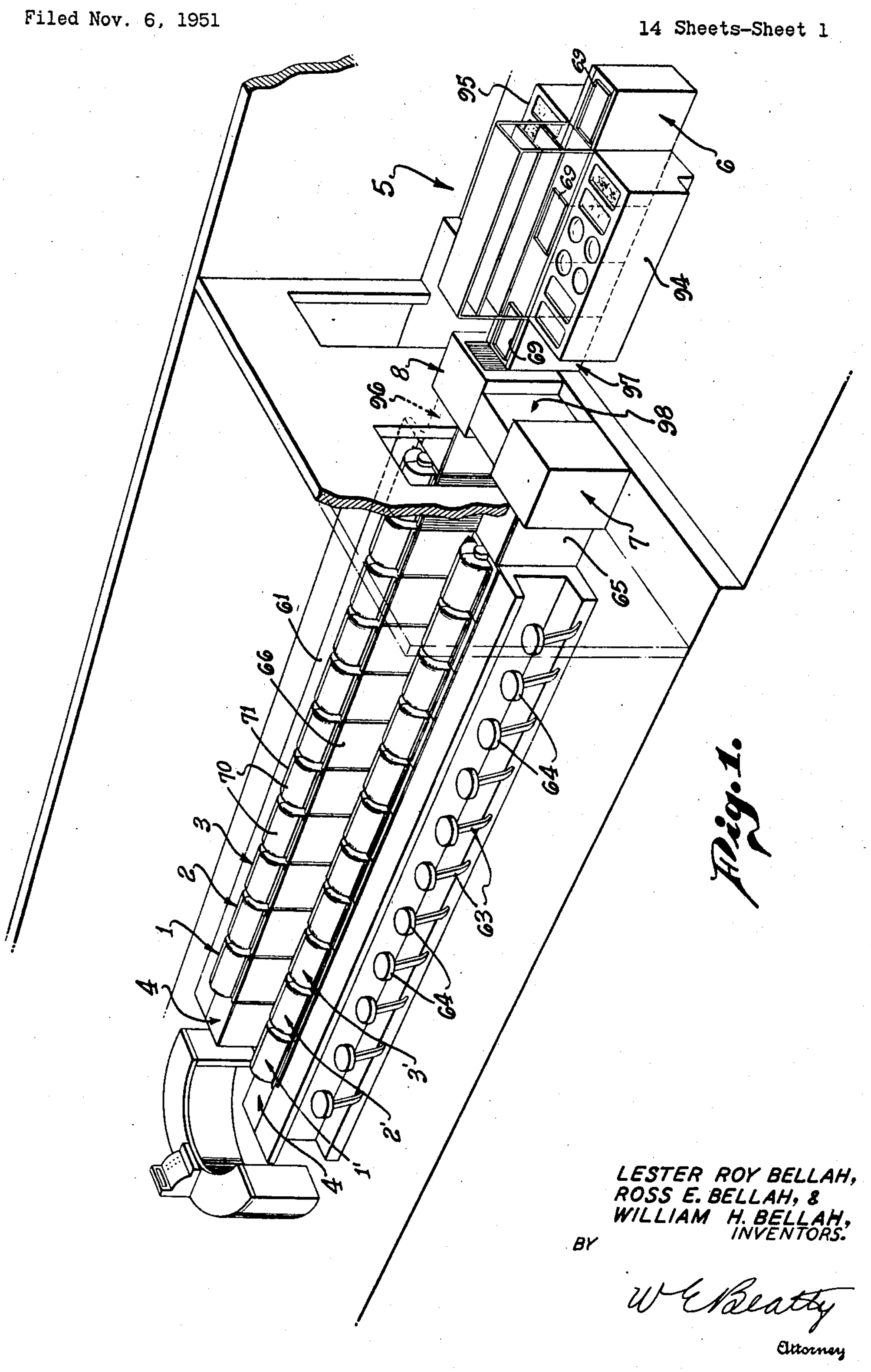
Fig. 1 is a perspective view of a restaurant embodying one form of the invention.

The exemplary arrangement illustrated in Fig. 1, shows a plurality of service stations arranged in two parallel rows, one row including individual service stations 1, 2, 3, etc., while the other includes the service stations 1′, 2′, 3′, etc. A suitable seat or stool may be firmly positioned in front of each service station and each service station may include a hooded cover and an area of table top between the stool and such cover. The two parallel lines of service stations may be spaced so as to permit a waitress or other attendant to walk up and down the aisle between the rows. At the end of each row is a lowering unit, such as the lowering unit 4, capable of transferring carriers from an upper trackway to a lower trackway. It is to be understood that a row of aligned units such as the row containing units 1, 2, 3, etc., form two trackways, the upper trackway being adapted to direct carriers away from the supply station or kitchen 5 toward the service units and the lowering unit 4, while the lower trackway returns the carriers to the kitchen or supply station 5. At the supply station end of such lower trackway there is an elevator, indicated at 6, which raises the carriers to the upper trackway. The carriers 15 then pass through the supply station 5 and in the course of their travel the orders carried by the trays on the carriers are filled by the attendants from the steam tables, urns and other supply sources available in the supply station. The carriers 15 may travel through the supply station 5 at a reduced rate of speed and then pass along the upper trackway to the service station unit from which their trip originated. Upon returning to such service station unit, an elevating mechanism raises the carrier from the upper trackway into a service position.

When two or more parallel or substantially parallel lines of service units are employed, as indicated in Fig. 1, special means are provided for converging the various trackways into a single trackway forming the kitchen or supply station. Obviously, such concentration of carriers cannot be carried to extremes, but several parallel or right angle lines of units may be converged to a single line of travel at the supply station. In order to permit this, we have provided turntable units, one of which is indicated at 7 and another at 8. The carrier traveling toward the supply station along the lower trackway of the row of service stations including the service stations 1', 2', 3', reaches the turntable unit 7 and is turned 90 degrees counterclockwise so as to pass from unit 7 along an interconnecting trackway in dummy unit 98 into unit 8. In unit 8 the carrier is turned 90 degrees clockwise and becomes a part of the stream of carriers flowing along the lower trackway at the supply station. Elevator unit 6 then raises these various carriers to the upper trackway wherein the orders are actually filled and placed upon the removable trays supported by the carriers. A carrier allocated to station 3' returns from the supply station by traversing the upper trackway into unit 8 where it is turned 90 degrees counterclockwise, through dummy unit 98, into turning unit 7. Unit 7 turns such carrier 90 degrees clockwise which places it in position to traverse the upper trackway of the line of service units 1', 2', 3'. The carrier then moves from the unit 7 to service station 3' where it is automatically arrested and lifted bodily into position substantially in the same plane as the table in front of the patron. The cover is automatically unlatched and partially opened indicating the arrival of patron's order and making it available to him. The hood or cover is locked at all times when the carrier is not in this service position, which prevents tampering.

Figures 3, 4, 5, 31:
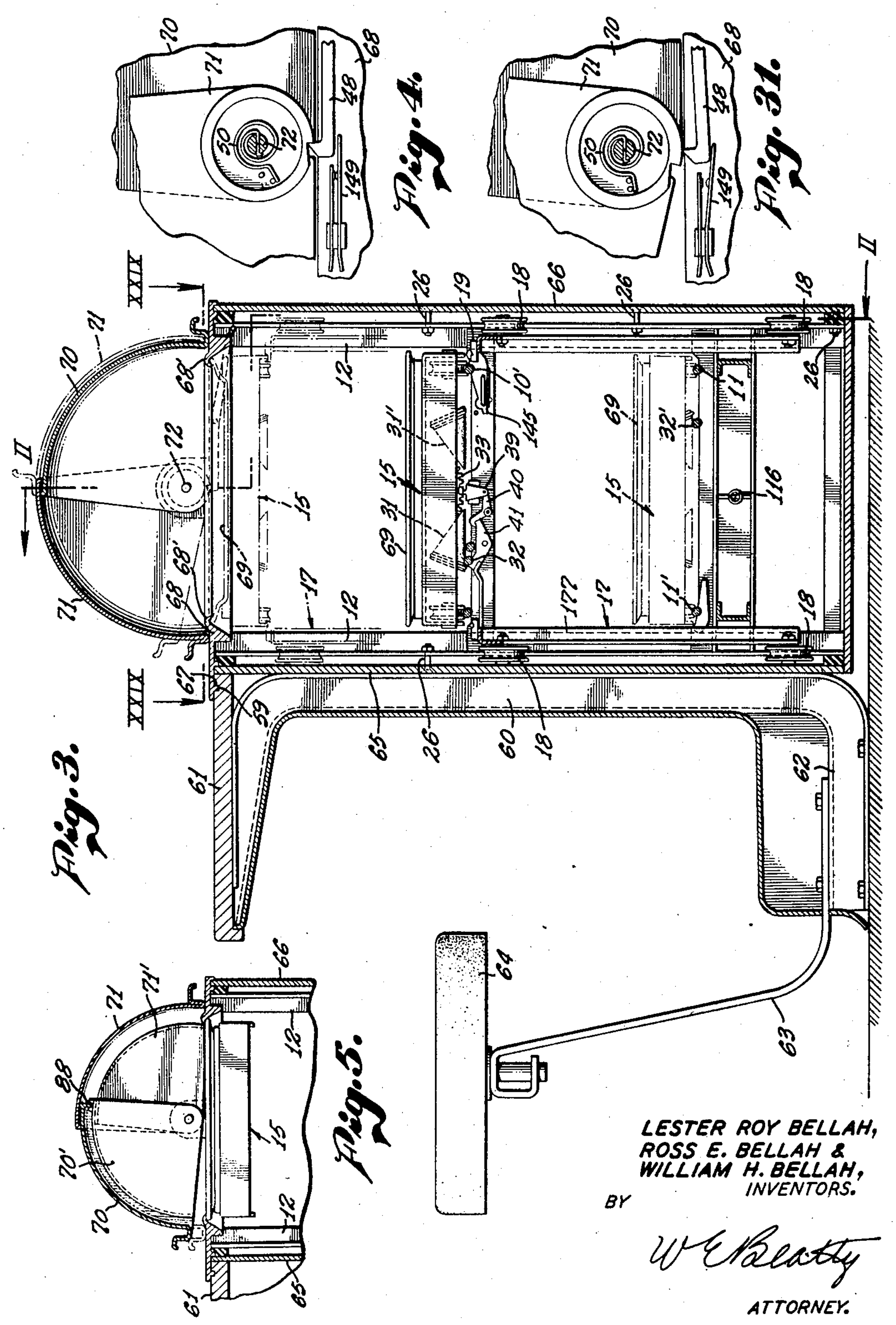
Figure 29:
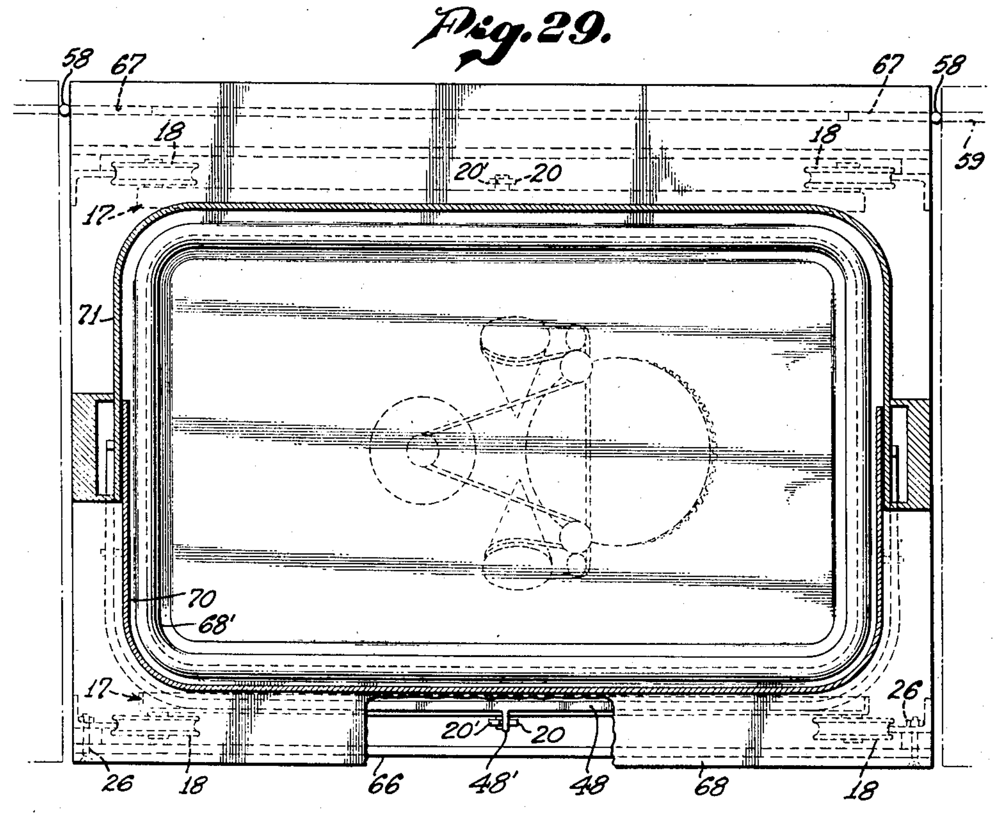

Each of the service stations may be a separate and distinct unit, capable of being taken out of a line and replaced by another one. The construction of a service station unit is readily apparent from consideration of Figs. 2 and 3. By specifically referring to Fig. 3 it may be noted that the service station unit there shown includes a standard 60, provided with a base portion 62 capable of being bolted or otherwise anchored to the floor, and an upper arm arranged to support the table 61. Attached to the base 62 is a preferably resilient stool support 63 carrying stool 64. The service station unit, suitably covered with a front panel 65, and a rear panel 66, is removably suspended from table 61 and held in place by bead 67 (on rectangular frame 68) which checks into groove 59 in table 61. Longitudinal displacement is prevented by plugs 58 in groove 59 as shown in Figs. 3 and 29. This service station unit includes three operating levels, the uppermost of which is an opening virtually in the same plane as the table 61, such opening being defined by a rectangular frame 68, capable of being engaged by and covering the upper edges of a tray 69 when such tray is in the elevated position indicated by dotted lines in Fig. 3. This uppermost opening or service level of the unit is normally covered by means of a semi-cylindrical hood composed of two sections 70 to 71 provided with suitable lifting lips or handles and having functions and positions which will be described later. Suffice it to say for the time being that the two sections have segmental end portions and are pivotally mounted upon a pivot point indicated at 72.

Each service unit also includes an upper trackway having the rails 10 and 10' and a lower trackway having the rails 11 and 11'. These rails are suitably supported by means of insulator cross members like 35 of Figs. 6 and 9 on vertical frame elements shown at 12 to which the front and rear panels are fastened.

Figure 10:
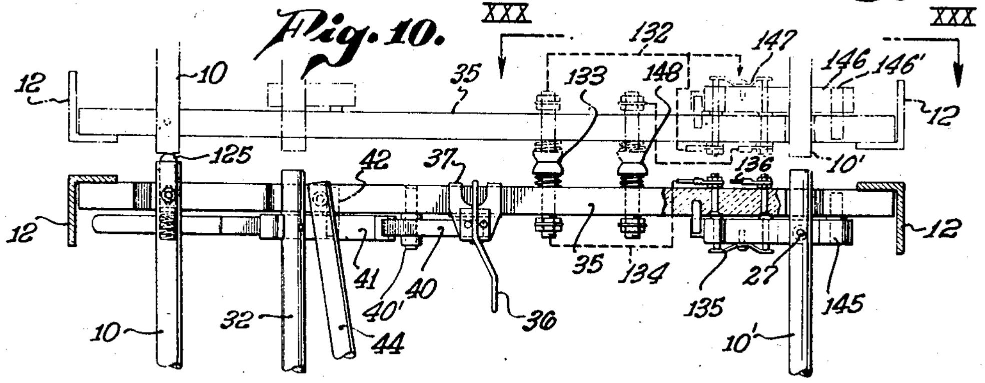

It is to be understood that when the various units abut in alignment, the upper and lower trackways 10 and 11 also abut in alignment and one rail of each pair is preferably interlocked or otherwise suitably electrically connected together, end to end, to act as busbars for the system. Fig. 10 shows one form of electrical connection between rails 10 at 125 which is identical between rails 11, and this contributes to easy removal of any unit from a line. These trackways are adapted to receive carriers 15 which removably support a tray 69.

Figure 2:
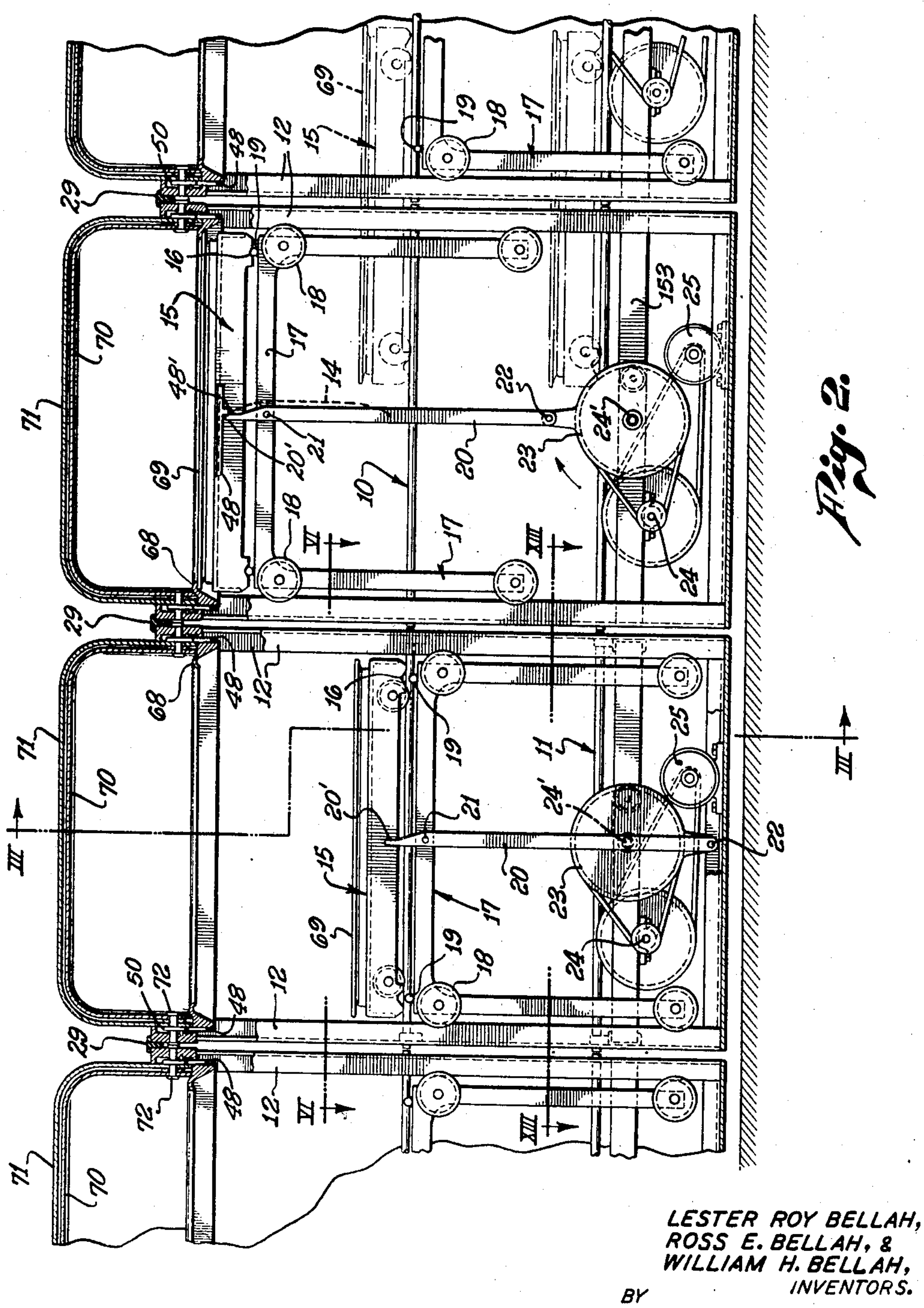
Figs. 2 to 35 are restricted to the rear line of units to avoid duplication.
Figures 6, 7:
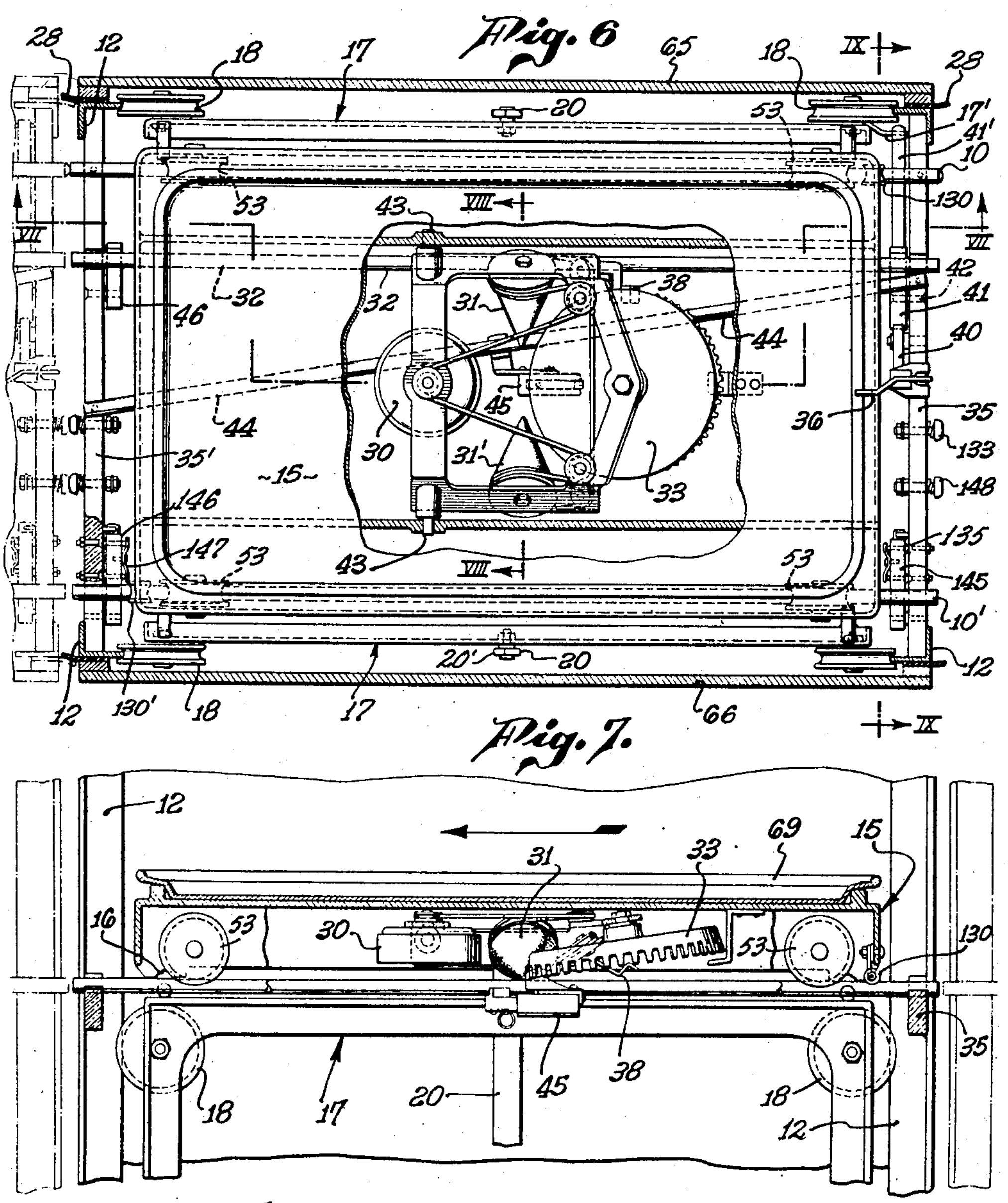
Figure 8:
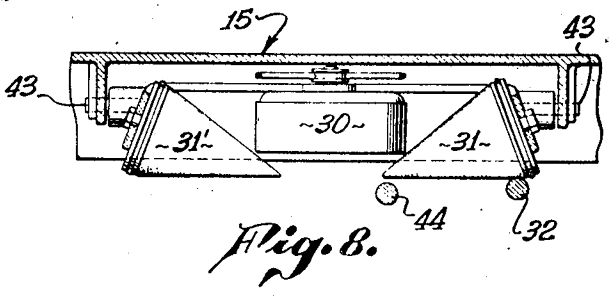
Figure 13:
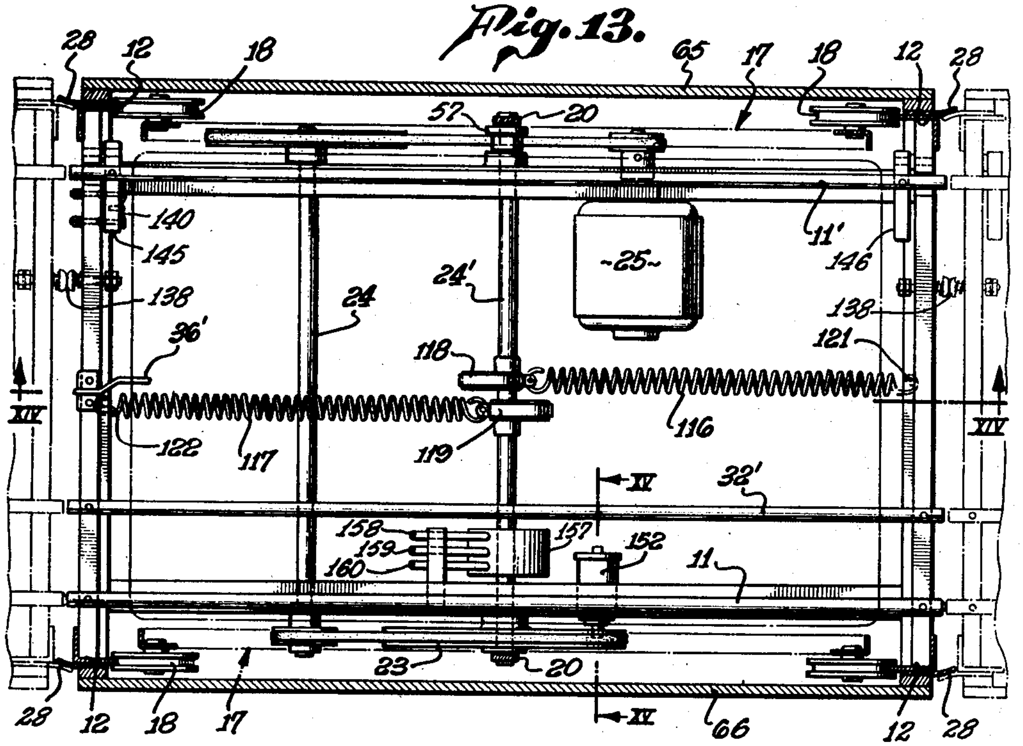

In order to prevent dust or other foreign matter from contaminating food carried by the trays and carriers and to facilitate cleaning as well as the removal of the units from a line, there are provided suitable sealing strips between the marginal edges of adjacent units, as clearly illustrated in Figs. 2, 6 and 13 by the numerals 28 and 29. These sealing strips may be insertable such as shown at 29 or they may be cooperating resilient strips carried by the framework of adjacent units and adapted to closely contact one another when the units are in aligned operating position. This latter construction is illustrated at 28 in Fig. 13. Other means of interlocking and sealing the units may be used.

*Carriers and service unit elevators*

Figure 34:
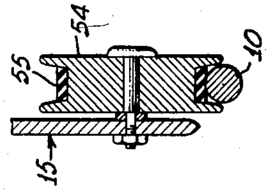

Each of the carriers 15 is provided with four wheels 53 adapted to run along the trackway, as shown in Figs. 6 and 7. A modification of the carrier wheels is shown in Fig. 34 in which a resilient annular ring 55 is snugly fitted to the wheel 54 to dampen noise and vibration, and increase frictional contact with rails as load increases to offset the momentum increase and prevent a carrier from coasting beyond the length of one section of the block system.

Each of the carriers 15 is in the form of an inverted open box having, at its lower edges, indentations with upwardly converging sides, as indicated at 16 (Figs. 2 and 7), such indentations being arranged to receive lift pins 19 on a vertically movable elevator 17 arranged to lift the carriers from the upper trackway 10 into an elevated service position.

Figure 32:
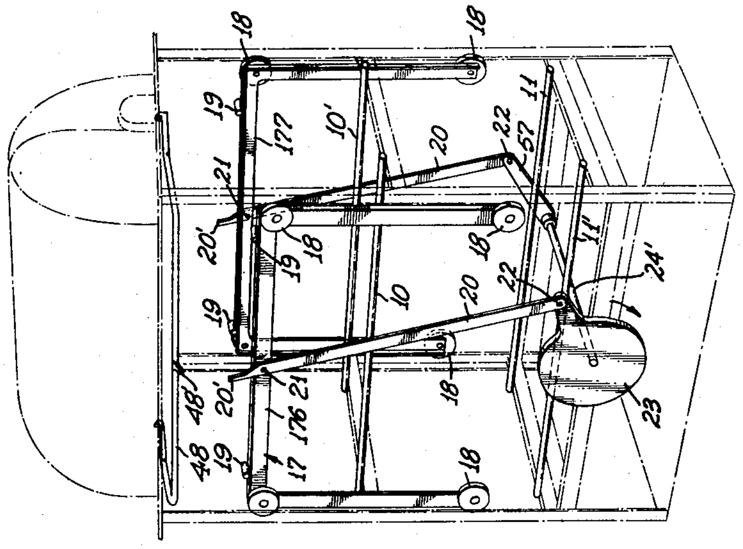
Figure 35:
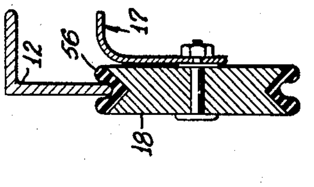

Each of the elevators 17 may comprise two cross heads 176 and 177, see Fig. 32, having downwardly depending legs provided with grooved rollers 18 arranged to roll on the vertical edges of the frame members 12. Fig. 35 illustrates a preferred form of roller fitted with a resilient grooved tire 56 to isolate the vibration of the elevator 17. Each cross head 176 and 177 of such elevators may carry pins 19 capable of extending into the indentations 16 of carrier 15. The inclined sides of the indentations 16 cause the carrier to be accurately positioned at the time it is lifted.

The character of the elevator 17 is best shown in Figs. 32 and 3. The cross heads 176, 177 and their respective connecting rods like 20 are on the outside of their respective rail sections 10 and 10', these cross heads being spaced apart a distance greater than the width of a carrier 15 and its tray 69. Also, each carrier has a length less than any unit. This gives a large economy of time for the reason that, when elevator 17 is idle and in its elevated position holding a carrier 15 and its tray 69 at the level of the table 61 for a particular customer, it does not hold up the delivery of other carriers and their trays to service stations beyond the one in question, nor does it hold up the return of carriers and trays from such distant stations along the lower trackway 11 to the kitchen. As described under the heading "Power and control means" the lock circuit of solenoid 152 is effective to break the circuit through the rails 10' and prevent a carrier like 15 from entering the unit in question, from the kitchen, but not to the kitchen, during the time when the elevator 17 is moving from its lowermost to its uppermost position and from its uppermost to its lowermost position.

Vertical motion is imparted to the elevator 17 in any suitable manner, but as shown in the drawings, such motion may be imparted by means of two connecting rods 20 pivotally connected to the cross heads at 21, the lower ends of the connecting rods 20 being pivotally and eccentrically connected as at 22 to a driving disc 23 and to a crank arm 57 on opposite ends, at each side of the lower trackway, of shaft 24'. Shaft 24' is driven from shaft 24 by a belt, see Figs. 13, 14 and 32. The shaft 24 is driven by a belt and pulley connection with a motor 25. The throw or eccentricity of the pivot points on disc 23 and crank arm 57 is slightly greater than the distance carriers are lifted so that pins 19 will be below and thereby clear carriers passing through on the upper trackway when the elevator is in its lowermost position.

Figure 14:
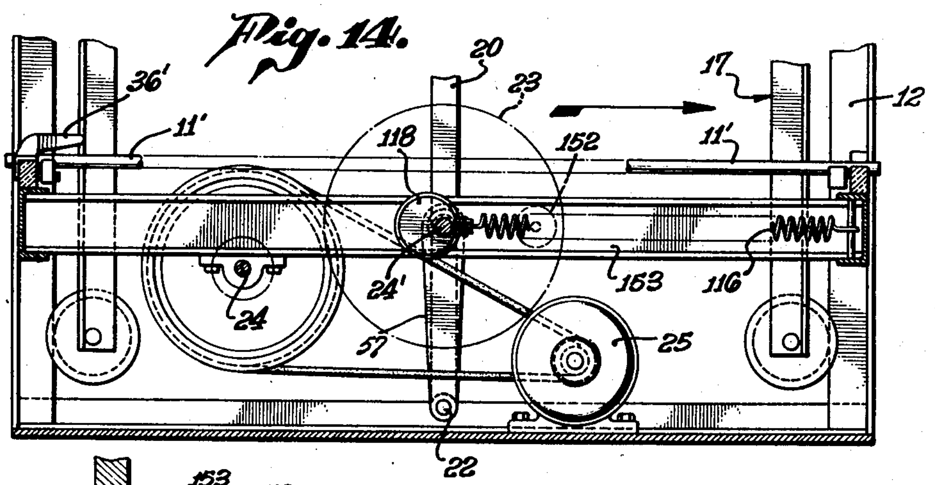

A feature of the construction of the present device is illustrated in Figs. 13 and 14, wherein oppositely disposed springs 116 and 117 are provided to counterbalance the weight of the elevator 17 with a carrier and tray thereon, minimizing the power required to operate the elevator. These service unit elevators 17 have the weight of the carriers and trays on them at all times when in operation but, the elevators of lowering unit 4 and end elevator 6 must return to their normal position empty. Therefore, to obtain maximum efficiency, the units 4 and 6 have their elevators plus one half the weight of a carrier and tray balanced in the identical manner.

The spring members 116 and 117 have one end connected to bands encircling antifriction bearings on oppositely disposed eccentric members 118 and 119 solidly fixed, on shaft 24', and their other ends connected to opposite frame members, as shown at 121 and 122. The opposed springs 116 and 117 are of equal strength and therefore counteract each other's pull on shaft 24', which explains the use of two springs in place of one.

Each of the carriers 15 carries an individual motor 30, supplied with electrical energy through rails 10 and 10' in the upper and rails 11 and 11' in the lower trackway. Motor 30, as best shown in Figs. 6 and 7, drives a pair of cones in opposite directions. Cones 31 and 31' have their apices toward one another and are in tilted position to hold the lower sides of both in a common plane. These cones contact straight and angular rails to control the speed, direction of travel and deceleration of the carrier. The cones 31 and 31' may be driven by means of an elastic cable so arranged, as mentioned, to simultaneously drive the cones in opposite directions, as indicated by the arrows. It will be noted that these cones do not contact the rails 10 and 10' upon which the carrier 15 rolls. Instead, there is provided a movable drive rail 32, in the upper trackway, which is capable of moving into or out of contact with the cone 31. The oppositely rotating cone 31' is inactive until the carrier reaches the lower trackway. By referring to Fig. 3 it will be noted that the drive rail 32 is shown in contact with the cone 31 in the upper trackway, whereas at the lower level the cone 31' is shown in contact with the fixed drive rail 32'. The drive rail 32' is on the opposite side of the longitudinal center of the trackways, from drive rail 32, and without turning the carrier around or reversing its motor 30, the direction of travel of carrier 15 is reversed by lowering the carrier to the lower level where the drive shifts from one cone to the other. In this manner, the upper trackway constitutes a one-way line of travel, whereas the lower trackway constitutes a one-way line of travel in the opposite direction.

Each carrier is assigned to a particular service unit, by providing a counting device which may or may not operate a turntable unit to select a proper avenue of egress and by providing a counting device which in effect counts the service stations so that each carrier may select its home position and be arrested there.

Figure 11:
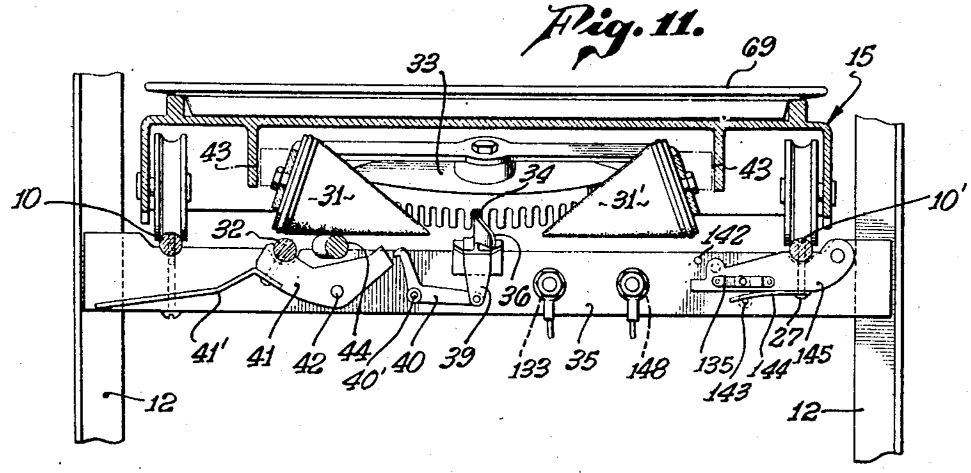

Cooperative means are provided on each carrier to insure the return of such carrier to its allocated service unit. Such means, in the illustrated example, include an index wheel 33, which as best shown in Figs. 6, 7 and 11, rotates in an inclined plane to isolate the active portion of the wheel to the teeth on the lower side. The index wheel 33 is provided with a plurality of downwardly extending teeth, the number of teeth being in excess of the number of service units in the line of the system being served so that the filled tooth space 34 is presented to only one unit of said system. The spaces between these teeth are of full depth with one exception, which is filled or of half the depth of the other tooth spaces and is indicated by the number 34. The function of this fill 34 will become apparent in the subsequent description.

Figure 12:
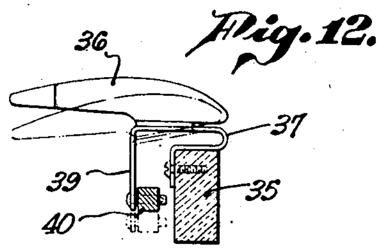

Positioned upon an insulator cross member 35 in each service unit is a trigger or trip 36 mounted on a yielding spring arm 37, see Fig. 12. As the carrier passes through the service units, the teeth of the index wheel 33 straddle the trigger 36, which has a joggle, see Fig. 10, of sufficient offset to advance the index wheel 33 one tooth, against a spring detent 38 (Fig. 7). When, however, the carrier enters its predetermined home service unit, the index wheel 33, having been preset, will have been advanced one tooth in each preceding unit until the partially filled tooth space 34 is in operative position and depresses the trigger 36 at the home service unit (shown in Fig. 11). Also, as the trigger is depressed, the joggle or offset of trigger 36 advances the index wheel one tooth, which places the tooth fill 34 on tooth beyond its operating position, so that the trigger 36 in any other unit will not be depressed.

Downward movement of the trigger 36 is transmitted by arm 39 to latch 40 which is pivoted at 40', releasing bell crank 41 which supports drive rail 32 at its entrance end shown at the right side of Fig. 6. The other end of drive rail 32 is supported by hinge member 46 shown at the left side of Fig. 6. Thus released, the drive rail assembly comprising 32, 41 and 46 pivotally falls from the position shown in Fig. 9, above the slow-down rail 44, to that shown in Fig. 11, below the slow-down rail 44. The driving cone 31 simultaneously drops onto the slow-down rail 44 (also shown in Fig. 11) since the entire driving assembly is pivoted off center on pins 43 to the carrier 15 (see Figs. 6 and 11). The drive rail 32 is reset to, and held in, the position shown in Fig. 9 (above the slow-down rail 44) by a finger 17′ of the elevator 17 which contacts spring extension 41′ of the bell crank 41 when the elevator is in its uppermost position, so as to re-establish a normal trackway for passage of carriers underneath the one in question on the upper trackway. Hence, any carrier may pass under any elevated carrier, either in proceeding to the kitchen from its home station or in returning to its home station from the kitchen.

The slow-down rail 44 is provided to uniformly slow-down and precisely stop the carrier so that beverages or other foodstuffs carried by the carrier are not spilled during the stopping or deceleration. This slow-down rail 44 (see Fig. 6) is rigidly mounted in an angular position with respect to the drive rail 32 and extends in a line from a point near the entrance end of the drive rail 32 to cross the line of travel of the apex of cone 31, at a point which will center the carrier in the service unit, and terminates on the insulator cross member 35′. When the drive rail 32 has dropped, as previously described, the driving cone 31 contacts the slow-down rail 44 near the greatest diameter of the cone 31, see Fig. 11, but as the carrier proceeds to a central position in the service unit, the contact progresses to the tip of the driving cone 31, as shown in Fig. 6. The motor 30 is a constant speed motor like a shaded pole induction motor. When the contact of the cone is progressing along the slow-down rail the momentum of the carrier tends to drive the motor as a generator, above its synchronous speed, which acts as a brake, uniformly decelerating the carrier 15. The carrier stops when the index wheel 33 slides onto the switch 45, as this lifts the pivoted drive assembly to thereby lift the cone 31 out of contact with the slow-down rail 44. In this way, the carriers 15 are arrested at the desired point within the units equipped with the slow-down rails.

It has previously been described that the drive rail 32 is dropped by the action of the filled tooth space 34 on trigger 36. Only when the drive rail 32 is dropped, will the filled tooth space 34 of the index wheel 33 be low enough to actuate the elevator switch 45 mounted on slow-down rail 44. Switch 45 closes a circuit to energize the motor of the elevator 17 when the elevator is in its lowermost position. The elevator 17 lifts the carrier with its tray 69 into service position in the top of the service unit frame, simultaneously resetting and holding the drive rail 32 to its upper position which prevents reactuation of switch 45 by the carrier in question when it is lowered, as the cone 31 rests on rail 32 holding tooth fill 34 too high to operate the switch 45.

As shown in Figs. 13 and 14, the lower trackway 11 is provided with fixed triggers 36′ having a joggle or offset the same as triggers 36 of the upper trackway 10, which turn the index wheel 33 in the opposite direction, one tooth for each trigger 36′ that the carrier passes over. Since the index wheel 33 is provided with sufficient teeth equal to or in excess of the number of stations which it traverses and since the triggers 36 of the upper and the triggers 36′ of the lower trackways turn the index wheel in opposite directions, the partially filled space 34 will be presented to the triggers only at that station for which it was preset. Triggers 36′ of the lower trackway only extend half way into the tooth space and therefore are cleared by the tooth fill 34 which rides over it at carriers' home station. The index wheel is a counting device as it counts the number of units through which it passes in the upper trackway and subtracts the same number on the trip in the lower trackway, there being an equal number of triggers in both trackways.

Certain of the turntable units give a choice of different avenues of egress. The index wheel 33 employed in the carriers which operate these turning units is slightly modified from the index wheel hereinbefore described. This modification is clearly shown in Figs. 26 and 27. The modification consists of one or more levers 130 having their inner ends pivoted centrally of the index wheel 33 and their outer ends carrying a spring-held plug 205 for selectively engaging and partially filling the upper portion of the space between any two selected teeth. The purpose of this adjustable partially filled tooth space will be pointed out during the description of the operation of the turntable units.

*Cover*

As previously stated in the description of Fig. 3, the service opening in the top of the service unit frame is covered by the pivoted, manually operable, semicylindrical cover elements 70 and 71. The cover element 70 may have a latch, not shown, which can only be opened by a waitress or attendant for the purpose of cleaning the tray or making adjustments. The cover element 71 which faces the patron also serves as an indicator of the tray's 69 presence within the service opening. Frame 68 has lip 68′ which overhangs and prevents removal of the tray 69. In a restaurant where the customer is to be served by a waiter the lip 68′ is omitted so that the waiter can remove the tray with its contents. Normally, the cover element 71 is partly open, as indicated by the dotted lines (Fig. 3), this is the position assumed by the cover element 71 when a tray is in the service position filling the service opening. When the bail latch 48 is disengaged from the notch 49 formed in the circular portion of the cover element 71 around the pivot point 72, switch 149 is open and the cover element 71, being spring-biased by spring 50, will assume the partly open position with sufficient tension to prevent accidental closing. When, however, the cover element 71 is closed, either by the patron after he has placed his order upon the tray 69, or by the waitress for returning the dirty dishes to the kitchen, the bail latch 48 engages the notch 49 and closes the switch 149 as shown in Fig. 4. The closing of the switch 149 will energize the elevator 17 to lower the carrier 15 with its tray 69 upon the upper trackway 10 providing the conditions to prevent collision with other carriers have been fulfilled as described later.

When a carrier containing the patron's filled order returns to its home service unit and the elevator is energized to lift the carrier into the position in the top of the service unit, the arm 20 of the elevator 17, being provided at its upper end with an extension 20′ (see Fig. 2) will flick the end 48′ of the pivoted bail latch 48 which permits the spring 50 to partly raise the cover 71 indicating to the patron that his order has returned and is available to him. The tip 20′ moves in the curved path indicated by dotted lines at 14, Fig. 2, on the upstroke of the elevator 17. The tip 20′ contacts projection 48′ at the top of its curved path 14, pivots latch 48 far enough to unlock cover element 71 and comes to rest at the side of projection 48′. This frees bail latch 48 for re-engaging notch 49 when cover is manually closed. Figs. 4 and 31 show these parts in the latched and unlatched positions.

Fig. 5 illustrates an important modification of the invention wherein each of the carrier trays 69 are supplied with individual covers, indicated at 70′ and 71′. These tray covers are similar in construction to the cover elements 70 and 71 and are arranged to nest therein when the tray with the covers is elevated into the service position. The tray covers 70′ and 71′ may be of any suitable construction and pivoted to the tray in order that the same will properly cover the tray and contents therein during the transportation of the tray to and from the supply station.

In this embodiment, the cover elements 70 and 71 are reversed so that a lip on cover element 70 will engage a groove in the tray cover 70′ as shown at 88 when the carrier 15 is in its uppermost position. Thus coupled, it is only necessary for the patron to manipulate the cover element 70 in order to raise both the covers 70 and 71′ to gain access to the contents of the tray.

The use of these covered trays, in addition to protecting the contents thereof, prevent articles falling from or extending over the edges of the tray and interfering with the operation of the system. While they have been shown as a modification to simplify the drawings, they are a safeguard when the invention is applied to public service.

*End lowering unit*

In discussing Fig. 1, reference was made to lowering unit 4, an elevator which serves the purpose of lowering the carriers at the end of each line of service units, from the upper trackway 10 to a lower trackway 11 so that the carriers may return to the kitchen or supply station.

Figure 16:
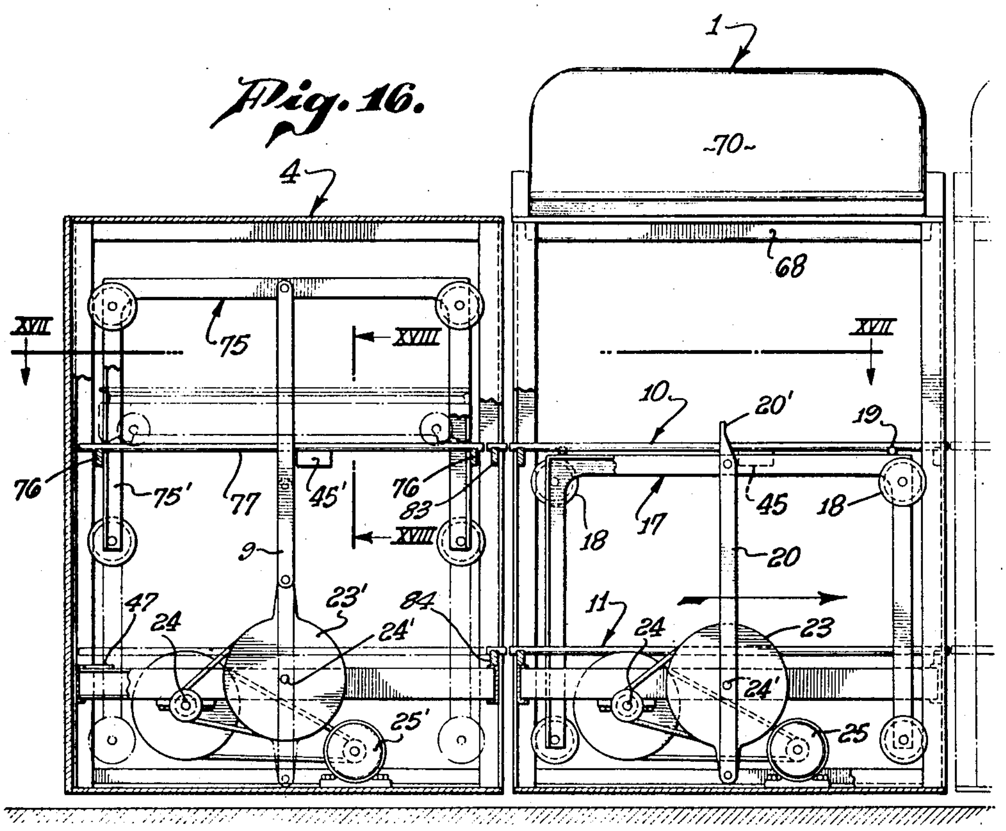
Figure 17:
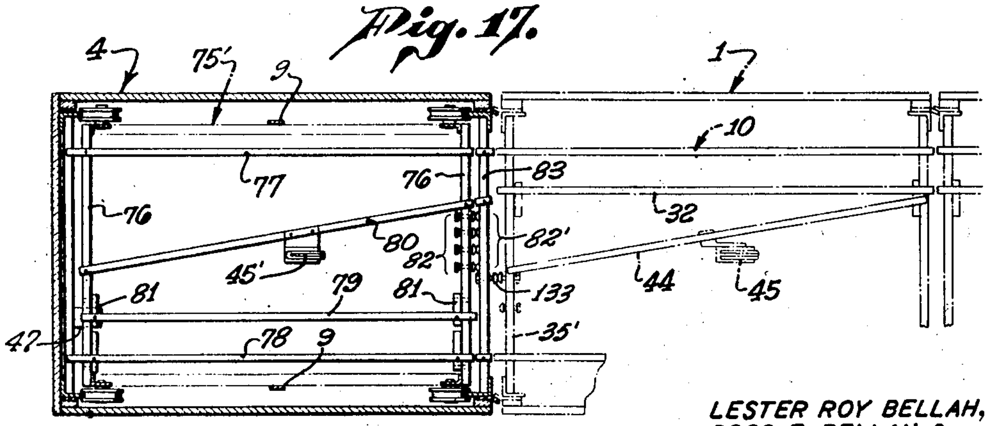
Figure 18:
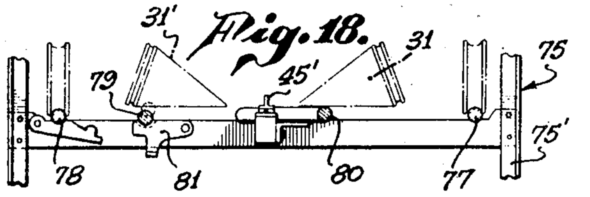

As shown in Figs. 16 and 17, the construction of the lowering unit 4 includes many of the elements and characteristics of a service unit. The lowering unit 4 includes an open frame, preferably closed at the top, and an elevator 75 similar to the elevator 17, but unlike elevator 17 in that a trackway is fastened securely to the elevator 75 which is normally in its uppermost position to receive carriers which have traversed the upper trackway 10. The downwardly extending side arms 75′ of the elevator 75 may be interconnected by insulator cross members 76 which carry the rail sections 77, 78, 79 and the slow-down rail 80. The arms 9 pivoted on driving disc 23′ on one side of the unit and crank arm 57 on the other side are arranged to move the trackway assembly 77—80 from the level of the upper trackway 10 to the level of the lower trackway 11. It may be noted from an examination of Figs. 16 to 18 that the slow-down rail 80 will cause the carriers to be smoothly arrested on the elevator 75 as explained in detail in connection with the service units. It will be noted that the drive rail 79 of elevator 75 is on the opposite side of the trackway centerline from the drive rail 32 of the service units' upper trackway and is normally in a depressed position below the slow-down rail 80 as best shown in Fig. 18. When, however, the elevator reaches the lower level, the drive rail hinge member 81 encounters a suitable stop 47, raising the drive rail 79 into contact with driving cone 31′ and lifting cone 31 above slow-down rail 80, thereby reversing the direction of travel in the lower trackway of Fig. 16, namely, toward the supply station.

Attention is also called to the fact that since the elevator 75 is to respond to every carrier, the switch 45′ operates from contact with the tip of any tooth on the index wheel 33 and is not correlated with any partial tooth space fill.

To electrically connect the trackway of the elevator 75 of unit 4 in both its up and down positions, a plurality of contact buttons 82′, supported by insulator cross bars 83 and 84 of the unit frame (Fig. 16), are arranged to cooperate with spring loaded contactors 82 on the insulator cross bar 76 of the elevator 75, and their electrical association will be later explained.

*End elevator*

Figures 19, 20:
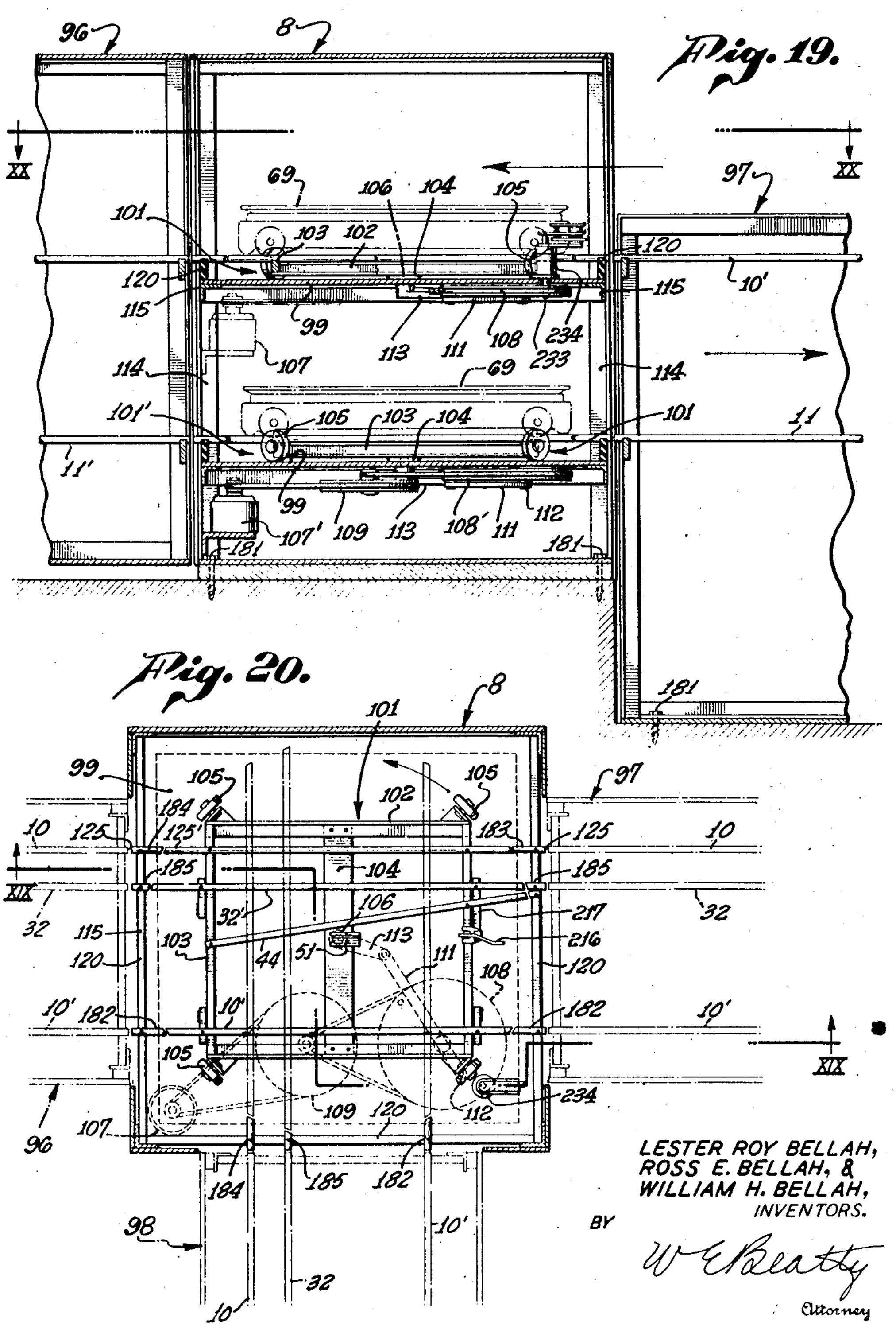

The supply station end of the system is provided with an end elevator 6 which is very similar in construction to the elevator referred to as lowering unit 4, but it raises the carriers instead of lowering them and is open at the top. The bases and tops are preferably at a lower level than the service units to present a comfortable working height to attendants as shown in Figs. 1 and 19.

Figure 21:
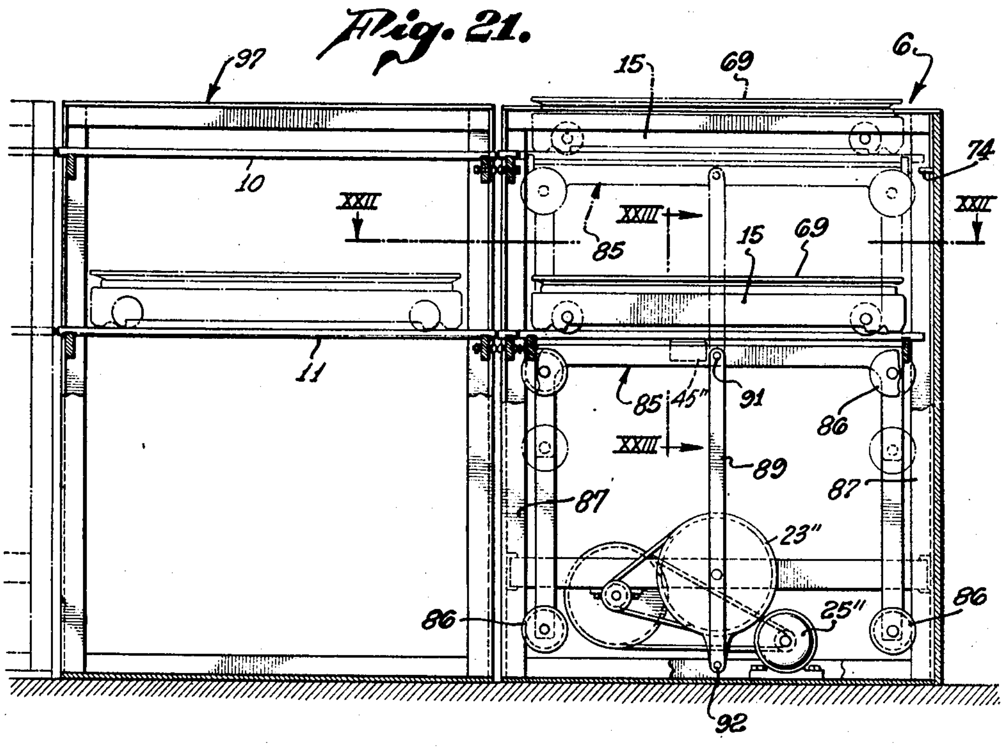
Figure 22:
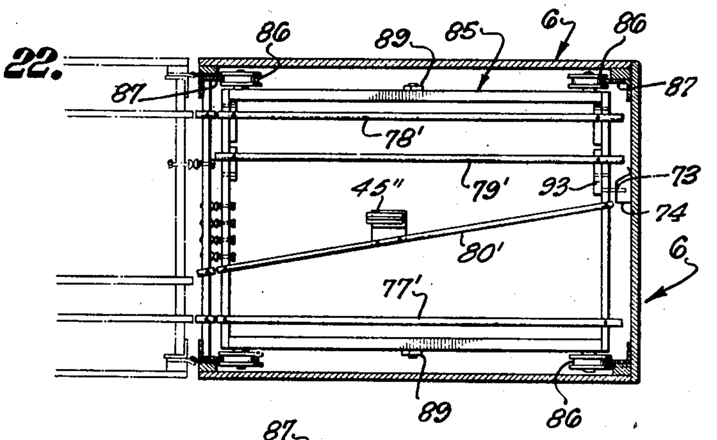

The end elevator unit 6 is best shown in Figs. 21 and 22 and includes an elevator 85 having legs provided with grooved rollers 86 arranged to roll along the edges of vertical frame members 87, this elevator being very similar in operation and construction to that contained in lowering unit 4.

Vertical motion is imparted to the elevator 85 by means of levers or connecting rods 89 pivotally connected to the cross heads at 91. The opposite ends of the levers are pivotally connected as at 92 to a driving mechanism identical with that described in connection with the elevators 17 illustrated in Figs. 13 and 14. The elevator 85 is normally in its lowermost position for receiving carriers which have traversed the lower trackway. The operation of the elevator 85 will be later described in detail.

*Dummy units*

Figure 24:
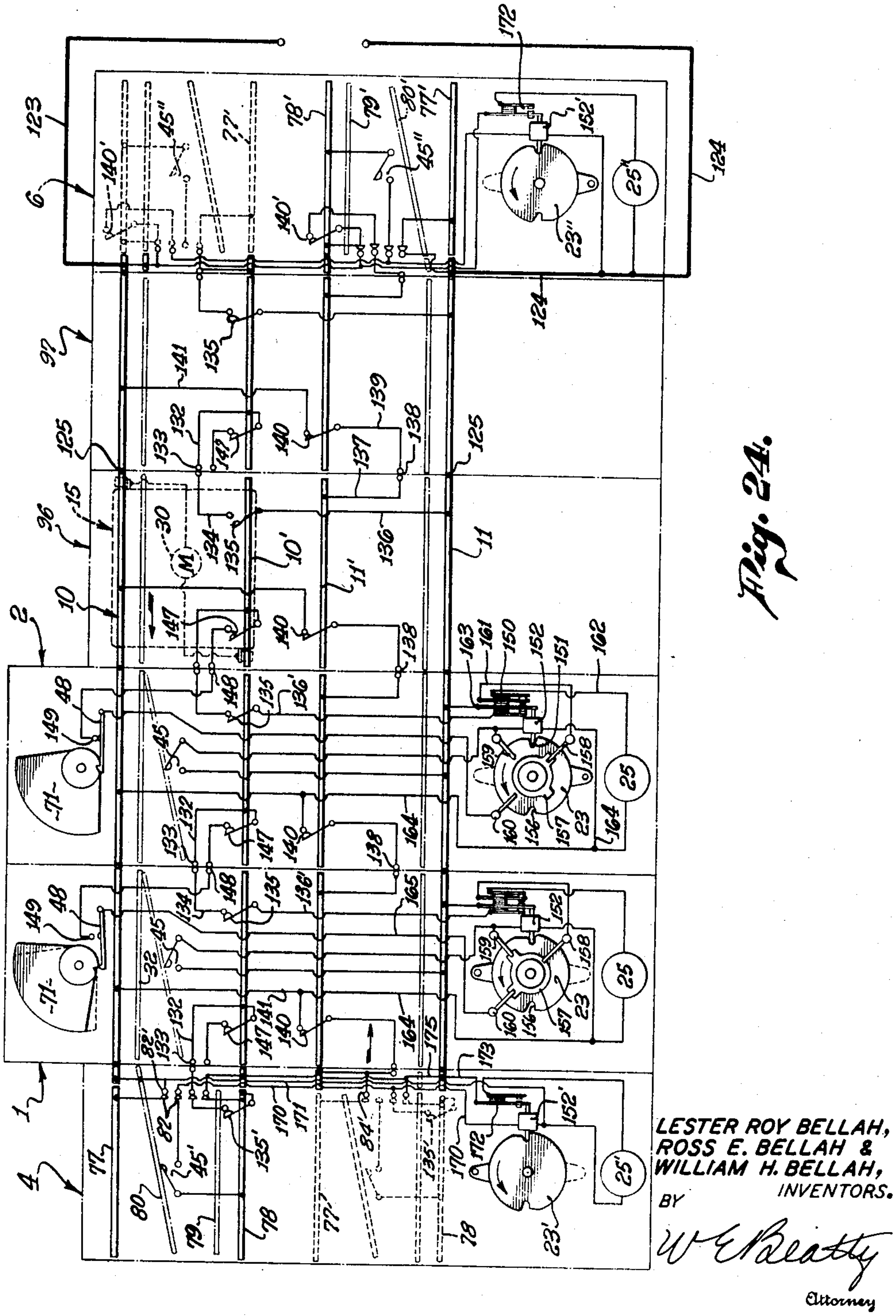

To provide flexibility in the association of the various units 1, 2, 3, etc. with each other, and, more particularly to take care of situations such as the wall shown in Fig. 1 where it is not practical to place a service station, as there is no room for a stool, the invention provides dummy units, examples of which are shown at 96 and 97 in Fig. 1 and also at 96 in Figs. 19, 20, and 24. These dummy units form interconnecting, sectional block system trackways between adjacent other units.

This dummy unit can be considered a service unit with the removal of the appurtenances to slow down, stop and raise the carrier; the hoods being replaced by a solid panel. A comparison of units 96 and 97 with units 1 and 2 in Fig. 24 reveal the electrical details common to both forms of units. The electrical association is explained under the heading "Power and control means." In Fig. 21 there is shown at 97 an open top modified dummy unit used to form the trackway through the supply station, referred to herein as a kitchen unit.

*Kitchen*

Referring to Fig. 1, the kitchen may include steam tables, indicated at 94 and 95, positioned on the opposite sides of and adjacent to the kitchen units like 97 having trackways extending to and from the aligned service stations 1, 2, and 3. It will be noted that the upper trackways of the kitchen units are open and present the trays 69 within ready access to the kitchen attendants. Also, it will be noted that between the steam tables and the row of service stations 1, 2, and 3, there are positioned dummy stations 96 and 97 having located therebetween the turntable unit 8, the details of which will be later described. The kitchen units, as previously mentioned, are uncovered dummy units, serving to extend the trackways 10 and 11, as indicated in the left hand unit of Fig. 21. Turntable unit 8 functions precisely as a dummy unit until carriers are received from or returned to an auxiliary line of service units such as 1′, 2′, 3′, etc., and in such case cooperates with turntable unit 7.

*Turntable units*

From the previous description it will be recalled that turntable unit 7 has only one avenue of egress whereas turntable unit 8 has two avenues of egress.

The controls for the unit 8 will be described in detail later. The controls for turning unit 7 are a simplification of the controls for turning unit 8 as follows. Remove catch 40 shown in Figs. 9 and 33 so that rail 32′ is in its lower inoperative position which permits the slow-down rail 44 to arrest a carrier entering the unit. When the turntable of the unit has turned 90 degrees, cam 52 raises drive rail 32′ into driving relation with the cone so the carrier will be driven out. Otherwise the construction of units 7 and 8 is the same.

Figures 25, 26, 27:
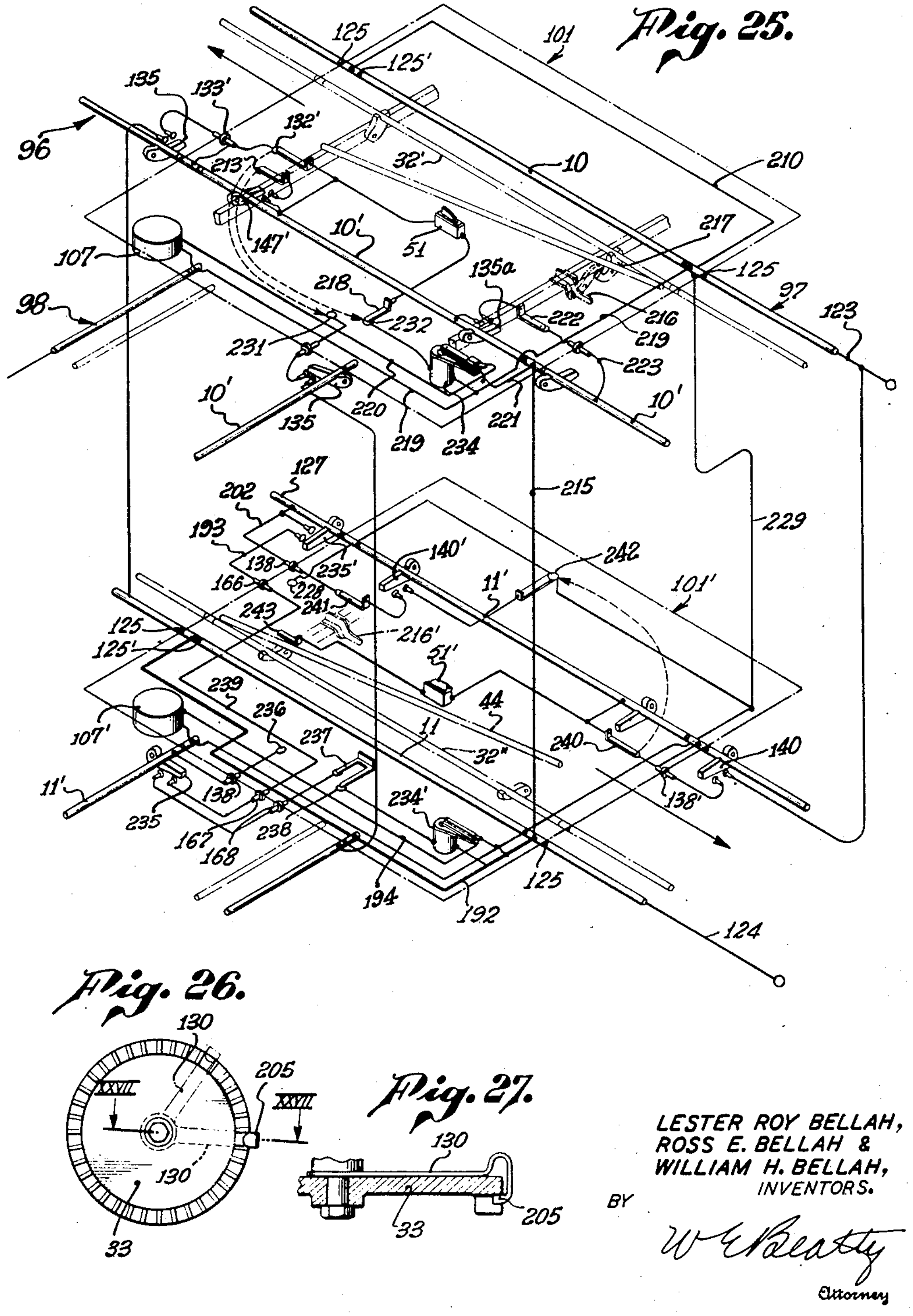
Figure 28:
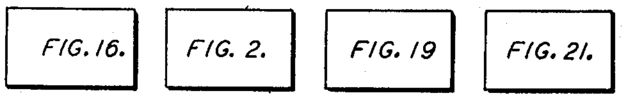

Each of the upper and lower turntables of units 7 and 8 (see Figs. 19 and 20) may consist of a bed plate 99 which rotatably supports a turntable track section represented in its entirety by 101. The turntable 101 consists of side members 102 and insulator members 103 forming a substantially open frame, the side members 102 being connected by crossbeam 104 and insulator end members 103, which support the rails, trigger 216 for the upper track and trigger 216′ for the lower track (Fig. 25). The turntable 101 is supported on the stationary bed plate 99 by the circular array of wheels 195 for oscillating the truck about a centrally located stub shaft 106, suitably journaled in an opening provided in the bed plate 99 and located centrally of the turntable. The upper end of the stub shaft 106 is rigidly fixed to the crossbeam 104, so that the turntable 101 will be rotated by the stub shaft 106. Means are provided for partially rotating the stub shaft 106 through an angle of 90 degrees, which means may consist of a motor 107 arranged to drive a pulley 108 by way of suitable belts and intervening pulley 109. Eccentrically pivoted on pulley 108 at 112 is one end of a connecting rod 111. The other end of the connecting rod 111 is pivoted to one end of crank arm 113, the other end of the crank arm 113 being rigidly connected to the lower end of the stub shaft 106, whereby one revolution of pulley 108 will oscillate turntable 101 through an angle of 90 degrees. Control means, later to be described, is provided for selectively turning the upper and lower turntables of each unit 90 degrees to change the avenue of egress or ingress to direct movement of carriers to and from the kitchen and to and from a desired line of units.

Framework similar to that provided in the service stations, such as vertical members 114 and cross members 115, are arranged to support the flat bed plate 99, and the motor 107 may be suitably supported by one of the side walls, as shown. Insulator cross members 120 support the short rail sections 182, 183, 184 and 185 and spring-biased contactors like 133 (Figs. 20 and 25). It will be apparent from Fig. 19 that the pulley 108, pulley 109, and their associated mechanisms are supported by the stationary bed plate 99.

The units like 8 and 97 are bolted to the floor with lag screws like 181, see Fig. 19. The units like 8 and 97 may be inserted in place or removed, vertically or horizontally. The removability of units like 8, while keeping the turntable 101 within the compass of such unit, is made possible by terminating the tracks 10, 10′, 11, and 11′ of unit 97 in a vertical plane, by terminating similar ends of tracks 10, 10′, 11 and 11′ of unit 96 in a vertical plane, those planes being spaced apart slightly more than the length of unit 8. Also, the insulator member 120 of unit 8 at both ends and one side thereof has short rail sections like 182 for rail 10′, 183 and 184 for rail 10 and like 182 for drive rail 32′. Similar short rail sections are mounted on insulator members 120, in the lower turntable, at opposite ends and one side for rails 11, 11′ and drive rail 32″. As shown in Fig. 20 the opposite ends of rails 10, 10′ and 32′ of the turntable lie in a circle with stub shaft 106 as its center, and the inner ends of the short rail sections 182 to 185 lie on a concentric, slightly larger circle. The outer ends of the short rail sections 182 to 185 are substantially flush with the plane of the corresponding exterior face of unit 8.

A particular advantage of the double cone arrangement for driving the carrier is apparent in connection with the turning units, namely, the fact that it is possible to slow down the carrier and bring it to a stop, regardless of different directions of approach, by instrumentalities which are encompassed wholly within the space of the turntable unit itself. Where the carrier approaches a service unit or end elevator, from one direction only, this advantage also obtains, namely, the arresting of the carriers at any one particular unit by instrumentalities wholly within the confines of the unit itself. This is a big advantage in that the necessary adjustment, either in the carrier itself or in the unit where malfunction occurs, can be effected without adjustment of any adjoining unit—also true when units are interchanged for service, repair, etc.

*Power and control means*

Referring first to the schematic wiring diagram illustrated in Fig. 24, there is shown a system of wiring for the row of units indicated at 1, 2, 3, etc., in Fig. 1, for the complete cycle of the carriers in that row. For the sake of simplicity, the wiring of a system comprising the minimum number of units which present the possible combinations is illustrated, it being understood that as many stations as required may be inserted in the line of units. Fig. 24 includes the wiring of the lowering unit 4, service stations 1 and 2, dummy stations 96 and 97 and end elevator 6. The wiring for the turntables is separately illustrated and will be described later. The row of service stations 1', 2' and 3' are identical units to 1, 2, 3 with the hoods or covers reversed, therefore, Fig. 24 is typical.

A power line, such as 110 volts A. C., is connected to lines 123 and 124. Electrical power for the carriers is supplied by way of rails 10 and 10' of the upper trackway and rails 11 and 11' of the lower trackway. Fixed rail 10 of the upper trackway is supplied with current from conductor 123 while fixed rail 11 of the lower trackway is supplied with current from conductor 124. These fixed rails on opposite sides and in different trackways of the units carry the current to the entire line of units. Circuits are closed to the other rails in a manner to be described hereafter. Each carrier 15 is provided with brushes or contact rollers shown at 130 and 130', Fig. 6, electrically connected to the motor 30, said rollers contacting rails 10 and 10' respectively. It will be noted that these rollers 130 and 130' are diagonally opposed in respect to the carrier 15, and from Fig. 3 that the rails 10' and 11' are on opposite sides of different trackways. Therefore, the hinged rails 10' and 11' are first contacted and depressed by a contact roller, 130 or 130' in the upper and lower trackways respectively, as the carrier enters a unit. This is required because the hinged rail sections comprise the sectional block system in which the depression of one rail section deenergizes the preceding rail section in the direction of travel in both the upper and lower trackways. This permits the contact roller 130 or 130' to establish its connection with the rail section it is entering before the rail section it is leaving is deenergized.

As most clearly illustrated in Figs. 6 and 10, the fixed rails 10 of each section are in electrical contact end to end, by means of spring loaded ball end contacts 125. An identical connection exists between the rails 11 of the lower trackway.

As shown in Figs. 6 and 13, the rails 10' and 11' are pivotally supported at each end by insulator hinge members 145 and 146 and are sprung upward against stops 142 (see Fig. 9) by leaf spring conductor 144. A conductor spring like 144 is fastened to each of hinge members 145 and 146 by screw 27, which screw also hold the rail. Spring 144 has a free end 144' against pin 143' and a similar spring 144 has a free end against pin 143 in Fig. 30. Switch element 147 is omitted from rail 11', otherwise, rails 10' and 11' are identical though reversed in position.

The purpose of hinging the rails 10' and 11' is to provide a sectional block system, having normally closed switches which the weight of a carrier will open by depressing the rails, to prevent collision between carriers and/or interference with the elevating, lowering and turning operations explained later.

The hinged rail sections 10' are connected to power line 124 in the following manner: By referring to diagrams of the kitchen or dummy units 96 and 97 shown in Fig. 24, it will be noted that the hinged rail 10' of unit 97 is connected by means of line 132 and contact 133 to line 134 and through switch 135 with the line 136 connected to the fixed rail 11 of the lower trackway in the succeeding unit 96. The lower fixed rail 11 is connected to power supply line 124. The contacts 133 and 148 are illustrated in Fig. 6 and may take various forms, insuring electrical connection between units when such units are placed in alignment. Moreover, by having spring biased contact terminals, as shown in Fig. 6 at 133, 148 and 125, the removal of units from the line and the substitution of others therein may readily be accomplished without any alterations in electrical wiring, soldering, etc., otherwise necessary.

It will be noted from Fig. 24 that the hinged rail 10' in the upper trackway of each unit of a line of units is connected to the fixed rail 11 of the lower trackway of the succeeding unit in the manner just described. This is also true of the lower trackway (where the carrier's travel is reversed) since the fixed rail 11 is firmly connected to line 124 of a power source, but the hinged rail sections 11' (not being connected to each other) are electrically connected to line 123 by means of a conductor 137, spring-biased or other suitable contact 138, line 139, switch 140 and line 141 which is connected to the fixed rail 10 and power supply line 123. It is to be noted that in the lower trackway the hinged rail section 11' of a unit such as 96 is electrically connected in the manner described to the fixed rail section 10 of the upper trackway in the succeeding unit 97.

Figure 9:
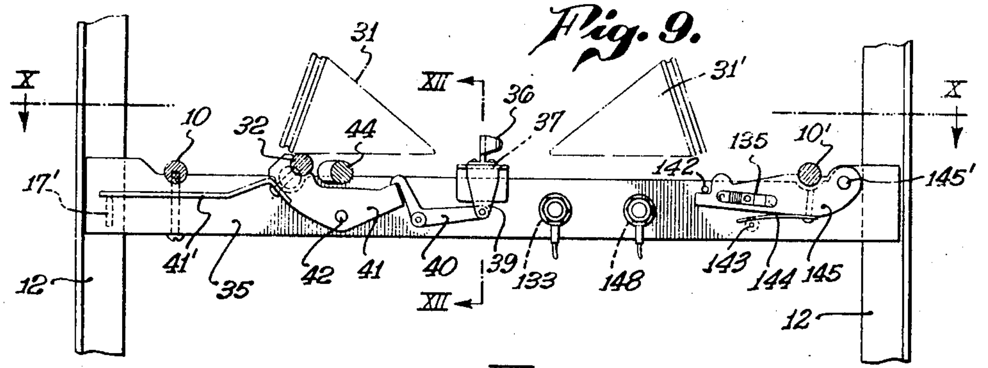

The switch 135 in the circuit described hereinabove is illustrated in Figs. 9, 10 and 11. It will be there noted that the hinged rail 10' is supported by an insulator hinge member 145 pivoted at 145'. The pivoted insulator member 145 also carries contacts indicated at 135 which can make or break the circuit with the lines 134 and 136. Switch 135 and its circuit is common to all but the end units as shown in Fig. 24, consequently, the representation in Figs. 9, 10 and 11 may be taken as typical. From an examination of Fig. 6 it will be noted that the opposing end of rail 10' is also mounted upon an insulator hinge member 146 pivoted at 146'. Hinge member 146 carries contacts indicated at 147 which can make or break the circuit between the rail 10' and the contact 148 which is connected to cover switch 149 (Figs. 4 and 31) as shown in units 2 and 96 on Fig. 24. The switch 147 is inactive unless its unit adjoins a service unit.

Figure 30:
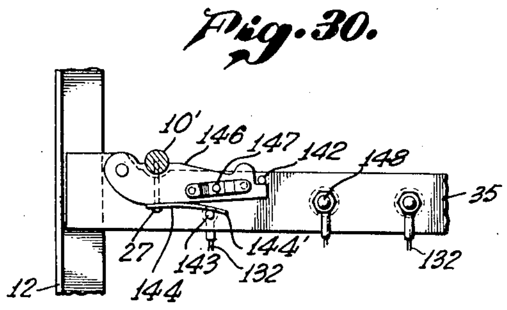

The weight of a carrier in the upper trackway will depress the hinged rails 10', simultaneously opening both switches 135 and 147. As shown in Fig. 30, electrical contact to the hinged rail section 10' is made by means of conductor 132, connected to a pin 143 in contact with spring conductor 144 which is connected and mounted by screw 27 through hinge member 146 to rail 10'. Rail 11' of the lower trackway operates and is electrically connected in the identical manner as rail 10'.

When the adjacent succeeding unit is a service unit, the switch 147 is utilized to interlock the operation of the elevator 17 with the sectional block system of the upper trackway to prevent interference between the two functions or movements of the carriers. It will be noted that the hood switch 149 in unit 1, Fig. 24, derives current through contacts 148 and switch 147, line 132, contact 133, line 134, block switch 135 and line 136', which leads to the three-pole switch 150. This three-pole switch and its relationship to the driving disc 23 is well illustrated in Fig. 15. It will be noted that the driving disc 23 is normally held in locked position by means of an armature pin 151 operated by the solenoid 152. This solenoid is mounted in a suitable, yieldable, shock resisting manner from the frame member 153. The driving disc 23 is provided with two diametrically opposed perforations adapted to receive the armature pin 151, such perforations being preceded by a recessed shoulder 154 and preferably succeeded by a slightly inclined plane 155. Although these recesses are shown in the face of the disc 23 in Fig. 15, they have been diagrammatically illustrated in the edge of the disc 23 in Fig. 24 for purposes of clarity. When in normal locked position, it will be noted that the main leaf 163 of the three-pole switch, which is connected to rail 11, is in closed contact, only with the leaf of line 136' leading to switch 135. A commutator ring 157 is fixed on shaft 24' with three stationary brushes such as 148, 159 and 160 as shown in Fig. 13. To simplify Fig. 24, this commutator ring 157 has been shown thereon as being a part of disc 23. It will be noted that brush 158 is electrically connected to the penultimate pole or leaf of switch 150 by line 161. The last leaf of the three-pole switch 150 is connected by lead 162 to the motor 25. The remaining leaf of switch 150 is connected by line 136' and through the switches previously described to hinged rail section 10' of the preceding unit, and to switch 149 of the cover 71.

If, therefore, a customer closes the cover 71 of unit 1, thereby closing cover switch 149, and the upper trackway of both units 1 and 2 are unoccupied, as shown in Fig. 24, the solenoid, being directly connected to rail 10 by line 164, will be energized through brush 159, commutator 157, brush 160 and line 165 to the cover switch 149, contacts 148, switch 147 to the hinged rail 10' (of the preceding unit 2) which is connected to the opposing power line as previously explained. As soon as the starting impulse passes through the solenoid 152 and initiates the withdrawal of armature pin 151 from the disc 23, this starting circuit and the circuit to rail 10' in unit 2 is broken by movement of the main leaf of three-pole switch 150 and a lock circuit to the solenoid is established between thte main leaf of switch 150 (connected to rail 11 by line 163) and the next leaf in series, which is connected by line 161, brush 158 and brush 159 to the solenoid 152, which is directly connected to the other side of the power source i. e. rail 10, through line 164.

Figure 15:
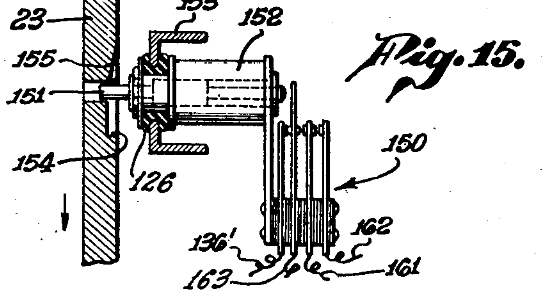

The lock circuit through the solenoid 152 holds the armature pin 151 retracted, see Fig. 15, connecting lines 161, 162, and 163 together which connects one side of motor 25 through line 163 to one side of the power source at rail 11, the other side of motor 25 being directly connected to the other side of the power source at rail 10, through line 164. The circuit of the motor 25 is held by the solenoid 152 which is locked until the counterclockwise rotation of disc 23 has progressed sufficiently to break the connection between brush 159 and commutator 157, deenergizing the solenoid 152. Concurrently, the recess 156 in disc 23 has moved away from pin 151 causing it to ride periphery of the disc which maintains the motor circuit through the remainder of the half revolution of the disc 23. As the driving disc 23 reaches the end of half revolution with the elevator nearing its lowermost position, it will be noted that the armature pin 151 will first drop into the recess 154 thereby breaking the motor circuit. By thus cutting off the motor before the pin 151 reaches the aperture in the disc 23 the momentum of the motor and disc 23 is reduced so that the shock of stopping them is minimized. When the armature pin eventually drops into the aperture of the disc, the final stopping shock is absorbed by the rubber grommet 126, Fig. 15, which supports the solenoid. When the motor 25 thus controlled, lowers the elevator 17 with a carrier and tray from its service position onto the upper trackway 10 and 10', the elements are in the position indicated in unit 2 of Fig. 24. Instead of stopping the elevator 17 by locking disc 23 with armature pin 151, this pin may operate a brake on the motor 25.

Attention is called to the fact that when carriers are being raised in a service unit it is necessary to release the cover and open switch 149 slightly before the commutator 157 assumes the position shown in unit 1 of Fig. 24, so as to prevent the immediate return of the elevator to its lowermost position.

It may also be noted that while the elevator is moving the carrier, the pin 151 rides on the face of the driving disc 23, though represented, for simplicity, as on the edge of the disc in Fig. 24. During this period of time the circuit to rail 10' of the preceding section in the series is broken, inasmuch as the main leaf of switch 150 is out of contact with the leaf connected to line 136'. As soon as the elevator reaches its lowermost stroke or its uppermost stroke, however, contact is re-established between 136' and line 163. As long as electrical connection is discontinued with rail 10' of the preceding section, it will be evident that carriers rolling toward a forward unit on the upper trackway, such as unit 1, will coast to a stop in the preceding unit, preventing interference with the movement of the elevator 17.

In the event a carrier is on its way toward unit 1 and is traversing unit 2 at the instant that the customer closes the switch 149 of unit 1, the elevator 17 of unit 1 will not operate because the circuit is broken by switch 147 of unit 2, such switch having been opened by the weight of the carrier on the hinged rail section 10'. If, therefore, no weight has been imposed on the hinged rail section 10' of unit 2 or unit 1 to cause either the switch 135 or 147 to open, the elevator of unit 1 will operate and during such operation a carrier entering unit 2 will be immobilized by reason of the fact that current to the hinged rail section 10' of unit 2 is interrupted by the three-pole switch 150 as previously described. When a carrier in unit 1 is lowered to the upper trackway of that unit, its weight depresses rail section 10' maintaining the immobilization of a carrier in unit 2 until it leaves unit 1.

When the elevator 75 of the lowering unit 4 is in its normal "up" position, the rail section 10' of unit 1 is energized through sliding contacts 82, then, the carrier just lowered onto the upper trackway of unit 1 may enter lowering unit 4, be arrested and centered by slow-down rail 80 and close the switch 45'. Closing switch 45' connects rail section 78 through sliding contacts 82 with solenoid 152' by line 170. The other side of the solenoid 152' is directly connected by line 171 to the opposing power source i. e., rail 10. The solenoid 152', thus energized, withdraws its armature pin which unlocks driving disc 23' and closed switch 172, completing the circuit through motor 25'. The circuit through solenoid 152' is interrupted by the initial movement of the elevator 75 but, the motor circuit is maintained by the armature pin riding the periphery of disc 23' until the elevator 75 reaches its lowermost position. The motor 25' is deenergized and the elevator 75 is arrested when the armature of solenoid 152' springs into the recess of disc 23', as previously described in connection with Figs. 13, 14 and 15.

It will be noted that a carrier entering the elevator 75 in its uppermost position, depresses the hinged rail section 78 opening switch 135', thereby disconnecting rail section 10' of unit 1 from the rail 11, by line 132. Normally, rail section 10' of unit 1 receives current by line 132, contact 133, switch 135′ and line 175 to the rail 11. Carriers are prevented from traversing the upper trackway of unit 1 when the lowering unit elevator 75 is loaded or in other than its uppermost position, because as soon as the elevator of the unit 4 starts to descend, it breaks contact between line 132 and the sliding contacts 82 leading to switch 135′, maintaining the electrical isolation of hinged rail 10′ of unit 1, until the elevator 75 returns to its normal uppermost position.

As previously explained, the lower trackway 11, 11′ is also provided with a sectional block system comprising the hinged rail sections 11′ and switches 140 which are identical with block switches 135 previously described, and are opened by the weight of a carrier. When, therefore, the elevator 75 of the lowering unit 4 reaches the level of the lower trackway 11 and the sliding contacts 82 are in contact with contact buttons 84′ as shown in dotted lines in unit 4, Fig. 24, and a carrier is still in the lower section of unit 1, block switch 140 of unit 1 would be open, thereby electrically disconnecting rail 77 of the elevator from its supply of current through line 141 connected to rail 10. As soon as the carrier leaves unit 1, the trackway of the elevator 75 will be energized by closure of switch 140 and the carrier in the unit 4 will leave said unit to start its trip toward the supply station on the lower trackway 11. When the carrier leaves the lowering unit 4, switch 135′ is sprung closed, thereby energizing the solenoid 152′ withdrawing the armature pin from its locking engagement with the driving disc 23′, closing the circuit to the motor 25′ and causing the elevator 75 to return to its normal position in the plane of the upper trackway, prepared to receive another carrier. The armature pin rides the periphery of disc 23′ to maintain motor circuit in the same manner as it does during the descent of the elevator 75.

Each of the units of a series contains the block switches such as 140 along the lower trackway 11 and it will be noted that the block switch 140 of a unit in advance of a carrier traveling toward the kitchen will always control the progress of such carrier through a unit farther removed from the supply station. When the carrier reaches the end elevator 6 and finds the elevator 85 in its lowermost position, the entry of the carrier upon the rails 77′ and 78′ of such elevator trackway will, first of all, cause the block switch 140′ to be opened, thereby electrically isolating the rail section 11′ of the adjacent kitchen unit 97. When the carrier is centered on the elevator trackway by the slow-down rail 80′, switch 45″ will be closed, thus closing a circuit leading to the solenoid 152″ of the end elevator 6. Withdrawal of the armature pin of solenoid 152″ unlocks disc 23″ and closes the switch 172′ which energizes the motor 25″. The elevator 85 of unit 6 is thus started on its upstroke which is arrested when the armature pin of solenoid 152″ springs into the diametrically opposed recess, opening switch 172′.

Figure 23:
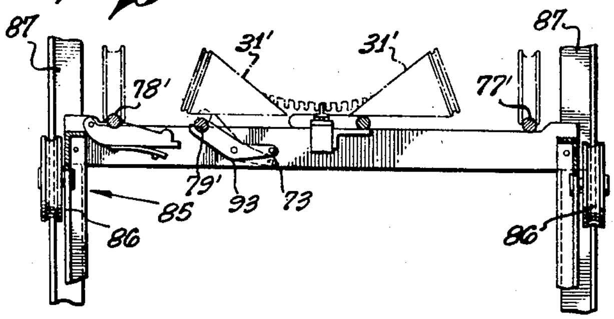

It may be noted that the slow-down rail 80′ of the end elevator 6 is on the opposite side of the trackway centerline from the slow-down rail 80 of the lowering unit 4. Since drive rail section 79′ is dropped when the elevator is in its lowermost position, means are provided for raising drive rail 79′ into cone contacting position as the elevator 85 reaches the level of the upper trackway. At this time, pin 73 carried by the bell crank 93, which supports drive rail section 79′, contacts a projection 74 properly positioned on the back panel of unit 6 to raise the drive rail section 79′ (Figs. 21, 22 and 23).

When the elevator 85 with the carrier 15 reaches its uppermost position, it will be noted that the carrier 15 will not progress into the kitchen unit 97 unless block switch 135 of unit 97 is closed. In other words, if a carrier is on the upper track section of unit 97, rail section 77′ of the elevator 85 is electrically isolated. When, however, the carrier leaves the elevator and rolls upon the upper track section of kitchen unit 97, the switch 140′ of rail section 78′ will spring closed. The closure of switch 140′, due to the removal of the weight of the carrier, will close the circuit from line 123 and stub rail section of the rail 10 through such switch to the solenoid 152″, thereby causing closure of switch 172′, energization of motor 25″, and a return of the elevator 85 to its normal lowermost position for receiving another carrier on the lower trackway.

As previously stated, as many service units and dummy units may be used in a line as desired, and Fig. 24 is simply exemplary. The operation of the supply station end elevator 6, though it raises instead of lowering the carriers, is virtually identical with the operation of the lowering unit 4. The sectional block system prevents a carrier from the adjacent unit 97 from passing on the lower trackway into unit 6 unless the elevator in unit 6 is both empty and in its lowermost position. A carrier on elevator 85 of unit 6 in its uppermost position will not leave it to pass into the upper trackway of unit 97 unless such trackway of unit 97 is unoccupied.

As previously mentioned, a turning unit like 8 may be interposed between dummy units, such as 96 and 97, to selectively turn and divert carriers into a branch line of units such as the front line of units in Fig. 1, represented by 1′, 2′, 3′ etc. These turning units are electrically associated with the various lines of units through the abutting dummy units. As shown in Fig. 25, the abutting dummy units 96, 97 and 98 are electrically coupled to the turning unit 8 through the existing connectors 133, 138, and 125 but require the addition of normally closed switch 235′ and connector 166 in dummy unit 96, and the addition of normally open switch 235 and connectors 167 and 168 in dummy unit 98. Dummy unit 97 does not require modification.

Alternatively, this electrical association of the turning units with their abutting dummy units may be accomplished without modification of the dummy units by providing switches, not shown, within the space of the turning units, these switches being mechanically coupled to the hinged rails of the dummy units like 96 and 98. This alternative maintains the interchangeability of all units without adjustment of other units.

Fig. 25 is an isometric wiring diagram showing the turning unit 8 interposed between dummy unit 96 and kitchen unit 97 of Fig. 24 to illustrate the power and control means employed to accomplish the functions described in connection with Figs. 1, 19 and 20. Only the parts of units 96 and 97 necessary to show functions beyond those shown in Fig. 24 are included.

The portion of unit 98 shown in Fig. 25 represents the root of another line of units as shown in Fig. 24 with the end elevator 6 removed. As previously explained, unit 7 makes use of only part of the controls embodied in unit 8 which eliminates the need of a detailed explanation of turning unit 7.

As shown in Fig. 25, each level of the turning units comprises a fixed rail section like 10 and a hinged rail section like 10', a drive rail section like 32' and the slow-down rail like 44 which insures centering of the carrier on the turntables of the turning unit. Also, as previously explained, the index wheels of the carriers which operate the turning units are slightly modified, by the addition of one or more adjustable tooth space fills to actuate a desired turning unit. A sectional block system of the character previously described is used to prevent interference with the turning operations.

In the normal position of the turntables as shown in solid lines on Fig. 25, current for the through passage of carriers is supplied by rails 10 and 10' in the upper trackway and rails 11 and 11' in the lower trackway. Rail 10 is connected to power line 123 through connector 125' (identical to connector 125 detailed in Fig. 10) by way of by-pass line 210. The hinged rail 10' is connected to power line 124 through rail switch 135 of unit 96', connector 133' (identical to 133, Fig. 10) and slip switch 132' and to rail 10' as previously explained in connection with Fig. 30. In like manner, rail 11 of lower turntable 101' is connected to power line 124 through bypass line 192 and hinged rail 11' is connected to power line 123 through switch 140 of unit 97.

It will be noted that the turning unit 8 functions as a dummy unit for carriers destined to and from the row of units 1, 2, 3, etc., and that the normal positions for the two turntables 101 and 101' is in alignment with this row of units.

If, however, a carrier is being returned from the kitchen on the upper trackway to a service unit in row 1', 2', 3', etc. (Fig. 1), means are provided for actuating motor 107 and turning the turntable 101 counterclockwise to permit the carrier to pass through dummy unit 98 into turning unit 7, where similar operations take place, the rotation being clockwise in unit 7. The turntable 101 carries rail sections 10 and 10', drive rail section 32' and slow-down rail 44. Rail section 10 is in electrical connection with stub rails 183 and 184 which are connected with rails 10 of adjacent units and with power line 123. The stub rails of rail 10 are connected by a by-pass connection 210 (Fig. 25). It will also be noted that conductor 215 connects stub rail 182 of rail 10' with rail 11 and power line 124 of the lower trackway.

Mounted on the turntable 101 is a trigger 216 which actuates bell crank support 217 to drop the drive rail section 32' when a carrier with an index wheel having a second, properly oriented, partially filled tooth space enters upon the trackway of the turntable and depresses trigger 216. Dropping of drive rail 32' causes the carrier to slow down and become centered on the turntable 101 in the precise manner heretofore described in connection with the slow-down rail 44 of the service units. As the carrier is centered, the index wheel 33 operates switch 51, closing a circuit to solenoid 234 through slip contact 218. Solenoid 234 is supplied with electric power from line 123 by conductor 219, which also extends to motor 107, and the circuit to this motor is closed through lines 220, 221 and 215, causing rotation of turntable 101 in a counterclockwise direction. When solenoid 234 is energized, it pulls a locking armature pin 233, like 151, Fig. 15, out of engagement with disc 108 shown in Figs. 19 and 20. This disc 108 has a pair of diametrically opposed holes and is a mechanical equivalent of disc 23 previously described, disc 108 being driven by motor 107.

Figure 33:
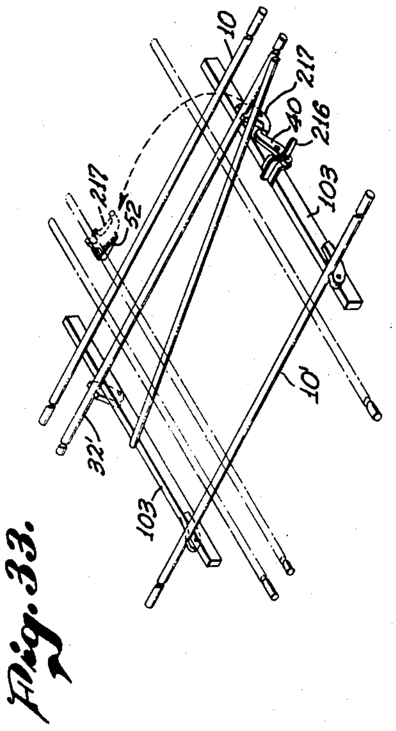

As soon as the turntable 101 starts to turn, contact 222 is broken, thereby disconnecting the rail section 10' of the preceding unit 97 and preventing a carrier from entering the turning unit. At the end of such rotation, as shown in Fig. 33, a cam wedge 52 cams drive rail 32' upwardly into locking relation with bell crank 217. This brings the drive rail 32' into contact with the driving cone 31 of the carrier at the time that rails 10 and 10' are in alignment with the rails of dummy unit 98.

Initial rotation of the turntable 101 breaks the connection of slip contact 132', thereby deenergizing rail 10' of the turning unit and deenergizing solenoid 234. When solenoid 234 is deenergized, it releases the locking pin 233 which rides upon the surface of disc 108 maintaining the motor circuit until the diametrically opposed hole in the disc 108 is encountered and the pin drops thereinto deenergizing the motor 107 and arresting the turntable at the dead center of the pivot 112 on disc 108.

As the turntable 101 completes its 90 degree turn to align itself with dummy unit 98 and permit the carrier to pass thereinto, a circuit to solenoid 234 is made available through slip contact 213, but this circuit is not closed until the carrier leaves the turntable and rail section 10', being spring biased, raises. This circuit includes solenoid 234, its associated stationary button terminal 232, slip contact 213, rail switch 147' slip contact 132', stationary button 231 associated with rail switch 135 in unit 98 and lines connecting the latter with rail 11. It is to be noted that switch 135 is a part of this circuit and therefore unless unit 98 is unoccupied, the circuit is not completed. As soon as the carrier leaves unit 98 and switch 135 is closed, solenoid 234 is energized through rail switch 147' and the turntable 101 returns to its normal position as shown in Fig. 25 ready to receive the next carrier.

It is to be remembered that drive rail 32' stays in its up-latched position to permit through traffic to pass directly into unit 96 until such time as trigger 216 is again tripped.

As previously explained, traffic from the lower level of the line of units 1, 2, 3 etc., including unit 96, passes through the lower turntable 101' of unit 8 in the same manner as through the lower level of any service or dummy unit.

If we assume that a carrier traveling from the line 1', 2', 3' approaches the turntable 101' on the lower trackway of dummy unit 98, the following circuit operates the turntable 101'. Rail section 11' of dummy unit 98 is provided with a normally open rail switch 235. Rail section 11' is electrically connected through connector 138 to a stationary button 236 in the turntable unit. When the turntable unit is in the position indicated in full lines in Fig. 25, one contact of rail switch 235 is connected over an obvious circuit with movable slip connector 237 to one side of the solenoid 234'. The other side of solenoid 234' is directly connected to power line 124 through rail 11. The other contact of rail switch 235 is connected over an obvious circuit through normally closed rail switch 235' of unit 96 and rail switch 140' to line 123.

It will be noted that when a carrier rests upon rail 11' of unit 98 and partially closes the above circuit by closing rail switch 235, the circuit will not be completed unless the lower turntable 101' is unoccupied and the lower trackway of unit 96 (including switch 235') is also unoccupied by a carrier. When these conditions are fulfilled, however, solenoid 234' and consequently the motor 107' are energized to cause the lower turntable 101' to rotate counterclockwise into position to receive the carrier from unit 98. Rail section 127 of dummy unit 96 is deenergized at any time the turntable is out of its normal position shown in Fig. 25 which blocks interference during rotation of turntable 101'. The drive rail 32'' is dropped at all times when the lower turntable 101' is out of its normal position so that in its alternate 90 degree position a carrier entering thereon will be stopped and centered by the slow-down rail.

When the lower turntable 101' is in position to receive a carrier from unit 98, rail 11' of unit 98 is energized by contact of brush 241 with stationary button 236, rail switch 140' and brush 230 on stationary button 228, button 228 being connected to line 123. Rail 11 of lower turntable 101' is electrically connected through spring loaded ball end contact 125' to rail sections 182 connected by conductor 192 to power line 124.

When the carrier centers on the lower turntable 101', it trips motor control switch 51' to close a circuit through said switch, brush 243 and stationary button 238 to solenoid 234', thereby releasing the disc 108' Fig. 19, and energizing the motor 107' to rotate the turntable 101' in a clockwise direction into its normal position as shown in Fig. 25. Slightly before this normal position is reached, the drive rail 32'' is cammed up by a cam like 52, Fig. 33, so that the carrier may move to the kitchen, provided block switch 140 in unit 97 is closed.

Smooth acceleration of the carrier is effected by the use of the flexible, elastic, round belt drive in combination with a motor of comparative uniform torque throughout its speed range such as a shaded pole induction motor.

The double cone drive as illustrated, has the distinct advantage of being fixed, without splined shafts, clutches or other expensive and trouble causing devices, for example, such as would be necessary to use a friction disc and sliding contact wheel. Also, the use of a constant speed motor eliminates the need for rheostats and/or other sources of electrical trouble.

The elevators as shown are of a construction affording silence and precise positioning which has been proven by a test model.

The utility or scope of the index wheel is nearly doubled with the doubling of the number of lines or rows of units. For example; assuming the index wheel has 100 teeth, a single line or row of units could not exceed this in number, however, if we add a row of units and converge the two rows into one supply line, one tooth of the index wheel would be used to select one of two rows, and the other 99 teeth would be used to select the service station unit in the row. There would be a possible 198 service station units in the two rows. Similarly, 10 rows converged into one supply line could have 910 service station units, 9 teeth of the index wheel used to select the row and 91 teeth used to select a particular service station unit in each row.

By the use of the various units and means herein described, a single kitchen or supply station may serve a tremendously large number of patrons seated at a large number of individual service stations without interference and in perfect assurance that an order filled and placed upon a carrier in the supply station will reach its proper destination in an automatic, rapid and safe manner without spillage of contents of glasses or dishes placed upon the carrier.

Also, while a preferred embodiment of the invention has been shown and described in connection with serving patrons at individual stations, it will be obvious that the invention comprehends the use of the units for supplying waiters or waitresses who may be assigned to different sections of a large dining room or to sections of extensive service counters. Lines of units may connect such sections with the kitchen, permitting such waitresses to employ the means of this invention in ordering and procuring food and other supplies for their patrons, eliminating long walks to the supply station.

Further, while only two rows of service stations have here been shown and described as being parallel, it will be obvious that the stations may be arranged in many patterns, angular or parallel, and any number of rows or units my be used, within the scope of the index wheel. It is to be also understood that the present invention may be utilized for supplying booths, in which case it would be desired to serve patrons from opposite sides of a line of units. Such a line of units and booths may consist of service units with their hoods alternately faced one way and the other as will now be described in connection with Fig. 36.

Figure 36:
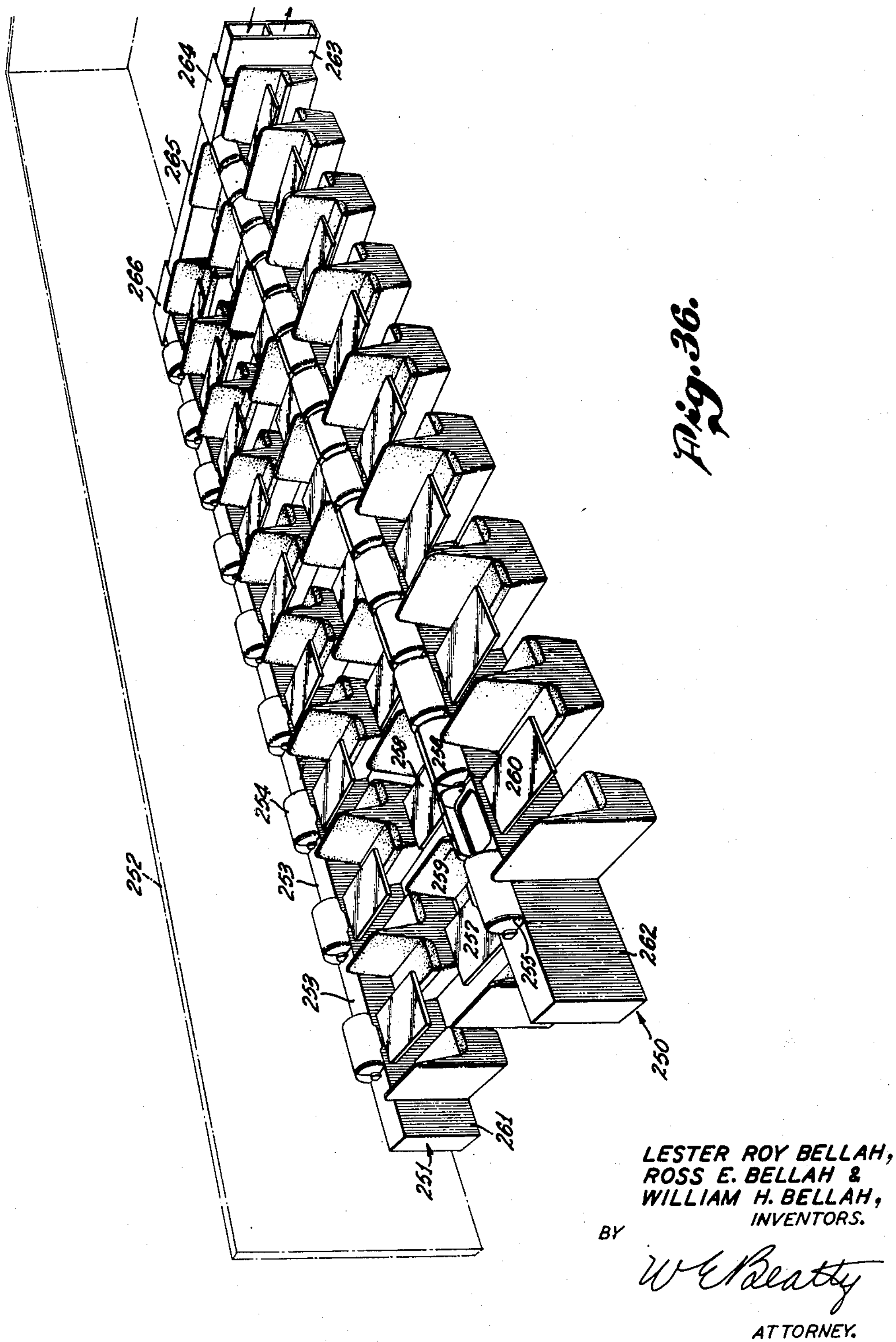
Fig. 36 is a perspective view of a modified form of the invention.

The modification in Fig. 36 illustrates the advantage which flows from the fact that the hoods of the service units are reversible. A line of service units is indicated at 250 which is away from the wall of the restaurant, while another line 251 is adjacent the wall 252. The lines 250 and 251 each comprise a sequence of service units like 1, 2, 3 etc. in Fig. 1. Interspersed with the service units in the line 251 are alternate dummy units 253 like 96 in Fig. 1, this alternate spacing of the service units being necessitated by reason of the fact that the customer can only sit at one side of the line 251 as it is against the wall 252 and that a booth requires a greater width than the length of a service unit. Each service unit has a hood 254 like the hood 70, 71 in Figure 3, or a double hood as shown in Fig. 5. The hoods 254 are placed on their respective service units so that they all open up on the same side of the line 251. As the line 250 has booths on both sides, it is formed of service units with alternately reversed hoods like the ones previously described. Hoods 255 and 256 open up for the far side of line 250 to be accessible to the patrons seated at tables 257 and 258 while the intermediate and alternate service units have their hoods in reversed position, for example, as shown at hood 259 which opens up for access to a patron seated at the table 260 on the near side of line 250. The lines of service units indicated at 250 and 251 are served from a kitchen somewhat in the manner described in connection with Fig. 1, the units 261 and 262 being elevators which lower the carriers from an upper trackway to a lower trackway like the lowering units 4 in Fig. 1 from the kitchen, not shown. From the kitchen, not shown, the carriers enter and leave by way of a dummy unit 263 like unit 96 in Fig. 1. Unit 263 abuts a turntable unit 264 which directs the carriers on an upper trackway either into the line 250 or into the line 251 as previously described in connection with unit 8 in Fig. 1. Turntable unit 264 abuts a number of dummy units indicated at 265 which abut a turning unit 266 to direct the carriers into or out of line 251 like unit 7 in Fig. 1. Instead of suspending the service and dummy units in Fig. 36 from a counter as indicated at 59 and 67 in Fig. 3, the two lines 250 and 251 may be in the form of cabinets having openings in their top sides into which the service and dummy units may be inserted or removed.

In this modification the panels are removed from the units which are separated by cabinet frame members which support stub rails to fill the gap between unit rails. These stub rails can be of any length under the length effectively spanned by the carrier wheels, so that a carrier does not release the hinged rail of one unit before entering and depressing the hinged rail of the succeeding unit, which is necessary for the functioning of the sectional block system. In view of this fact, it is obvious that the cabinets can be constructed with a great amount of variation in the center to center spacing of the units, without change in the units themselves.

Those skilled in the art will readily understand that the flexibility, interchangeability and adaptability of the various units permit their arrangement in various manners and for various purposes. The units may be used to facilitate the retail or other sales of a variety of commercial establishments as well as restaurants, and could be adapted for factories where small mechanisms are assembled, tested or produced. The units need not be arranged in straight lines, but instead may extend along rectangular or even circular lines of travel, the whole trackway being on the same level eliminating the need for end elevators. The use of covers is desirable in restaurants but may be dispensed with in other instances. The cone drive and index means for the carriers may be employed, without use of elevators or lifts at the service stations, as elements of transportation systems for bringing supplies to specific, allocated stations along the systems.

We claim:

1. In a service system the combination of: a trackway; a carriage provided with wheels to roll along said trackway; a driving assembly mounted on the carriage, said driving assembly comprising a pair of driving cones with their apices toward each other and their sides tangent to a common plane parallel to the plane of the trackway and means for rotating the cones in opposite directions; and rail means arranged for contact with a selected cone for controlling the direction of movement of the carriage along the trackway.

2. In a service system of the character stated in claim 1, the provision of indexing means mounted on the carriage for stopping said carriage at a predetermined location along the trackway.

3. In a service system, the combination of a carriage, a driving assembly thereon comprising a motor, a pair of oppositely rotating members coupled to said motor, a rail in position for contact with one of said members for travel of said carriage in one direction and another rail in position for contact with the other of said members for travel of said carriage in the opposite direction, means supporting said members in one position for contacting one thereof with one of said rails or in another position for contacting the other thereof with the other of said rails, and means for shifting said members from one of said positions to the other.

4. In a service system, the combination of a carriage, a driving assembly thereon comprising a motor, a pair of oppositely rotating cones coupled to said motor, a rail in position for contact with one of said cones for travel of said carriage in one direction and another rail in position for contact with the other of said cones for travel of said carriage in the opposite direction, means supporting said cones in one position for contacting one thereof with one of said rails or in another position for contacting the other thereof with the other of said rails, and means for shifting said cones from one of said positions to the other.

5. In a service system, the combination of a carriage, a trackway for said carriage, said carriage having a motor having a shaft, cone means on said carriage coupled to said shaft, two drive-rails along said trackway for said cone means, said drive-rails having different driving relations with said cone means, means movably supporting one of said rails, means for moving said movable rail from a position out of driving relation with said cone means to a position in driving relation therewith to thereby move said cone means out of driving relation with the other rail, and means supporting said cone means for movement into or out of driving relation with one or the other of said rails by said movement of said movable rail.

6. In a service system, the combination according to claim 5, said movable rail being substantially parallel to said trackway, said other rail comprising a slow-down rail contacting successively smaller peripheral portions of said cone means to decelerate said carriage, said cone means having an apex crossing said slow-down rail substantially at the destination of said carriage.

7. In a service system, the combination according to claim 5, said cone means comprising a cone, said movable rail being substantially parallel to said trackway and contacting an outer peripheral portion of said cone, said other rail comprising a slow-down rail contacting successively smaller peripheral portions of said cone to decelerate said carriage, said cone having an apex crossing said slow-down rail substantially at the destination of said carriage, said movable rail being movable after said carriage has stopped to continue the travel of said carriage on said trackway in the same direction as its direction of arrival.

8. In a service system, the combination according to claim 5, said cone means comprising oppositely rotating cones, said other rail comprising a slow-down rail contacting successively smaller peripheral portions of one of said cones to decelerate said carriage on arrival in one direction, said one cone having an apex crossing said slow-down rail substantially at the destination of said carriage, said movable rail being substantially parallel to said trackway and in position to contact the other of said cones to drive said carriage in the opposite direction.

9. In a service system, the combination according to claim 3, an upper track and a lower track for said carriage, an elevator for conveying said carriage from one of said tracks to the other track, said shifting means comprising means controlled by said elevator.

10. In a service system, the combination of a carriage, a trackway, said carriage having a motor having a shaft, a cone coupled to said shaft, drive-rail sections for said cone, means movably supporting said cone on said carriage and means urging said cone towards said drive rail sections, one of said sections being substantially parallel to said trackway and a conjoining section contacting successively smaller peripheral portions of said cone to decelerate said carriage, said carriage having inertia tending to cause said motor to overrun said cone as a generator and act as a brake for said carriage when said cone is on said conjoining rail section on arrival of said carriage at said conjoining section.

11. In a service system, the combination according to claim 5, an elevator for removing said carriage from said trackway and for replacing the same thereon at certain times, said means for moving said movable rail being under control of said elevator.

12. In a service system, the combination of a carriage, having a trackway for said carriage, said carriage having a motor having a shaft, a cone coupled to said shaft, a drive-rail for said cone substantially parallel to said trackway, said drive-rail having a movable section, a slow-down rail for said cone opposite said movable section, said slow-down rail being arranged at an angle to said trackway to contact successively smaller peripheral portions of said cone to decelerate said carriage, said cone having an apex crossing said slow-down rail opposite said movable section, means supporting said movable rail section in one position below and out of driving relation with said cone or in another position above said slow-down rail and in driving relation with said cone, means urging said cone to contact said drive rail, and means for operating said movable section.

13. In a service system, the combination according to claim 12, said means for operating said movable section comprising indexing means on said carriage, said indexing means being responsive to the travel of said carriage.

14. In a service system, the combination of a trackway, a carriage provided with wheels to roll along said trackway, a driving assembly mounted on said carriage, said driving assembly comprising a pair of driving cones with their apices towards each other and their lower sides tangent to a common plane parallel to the plane of said trackway, means for rotating said cones in opposite directions, rail means arranged for contact with one of said cones for movement of said carriage along said trackway in one direction at certain times, other rail means arranged for contact with the other cone for movement of said carriage along said trackway in the opposite direction at other times, and means under control of said carriage for selecting the particular one of said cones which shall be in contact with its drive-rail.

15. In a service system, the combination of a carriage, a trackway for said carriage, said carriage having a motor having a shaft, a cone coupled to said shaft, two drive rails for said cone, one of said drive rails comprising a movable rail parallel to said trackway and in the path of an outer peripheral portion of said cone, the other rail being at an angle to said trackway to engage successively smaller portions of said cone as said carriage approaches, a fixed support for said angular rail, a hinge support for one end of said movable rail, a pivoted arm supporting the other end of said movable rail, said arm tending to drop said movable rail below the level of said angular rail, a catch for holding said arm with said movable rail above the level of said angular rail, means on said carriage and operable on arrival of said carriage for operating said catch, an elevator for removing said carriage from and for restoring the same to said trackway and means controlled by the restoring movement of said elevator to reset said catch and operate said arm to raise said movable rail above said angular rail.

16. In a service system, the combination according to claim 10 comprising means operated on arrival of said carriage at its destination for relatively moving said conjoining rail section and said cone out of driving relation.

17. In a service system, the combination of a carriage, a trackway for said carriage, said carriage having a motor having a shaft, a cone coupled to said shaft, a high-speed drive rail and a conjoining slow-speed drive rail for said cone, said high speed rail being substantially parallel to said trackway, said slow-speed drive rail being in position to contact successively smaller peripheries of said cone as said carriage proceeds, means movably supporting said cone on said carriage, means urging said cone towards said drive rails, and a shoe in position to overcome said urging means and move said cone out of driving relation with said slow-speed rail upon deceleration of said carriage by said slow-speed rail.

18. In a service system, the combination of a carriage, a trackway for said carriage, said carriage having a motor having a shaft, a cone coupled to said shaft, a high-speed drive rail for said cone, a conjoining slow-down rail in position to contact successively smaller peripheral portions of said cone, means for moving said high-speed rail out of driving relation with said cone to bring said slow-speed rail in driving relation therewith on arrival of said carriage, means for thereafter moving said cone out of driving relation with both of said rails to stop said carriage, and means for thereafter moving said high-speed rail into position for driving relation with said cone to thereby prevent said cone from establishing driving relation with said slow-speed rail to continue travel of said carriage on said trackway in the same direction as its direction of travel on arrival.

References Cited in the file of this patent

UNITED STATES PATENTS

| Number | Name | Date |
|---|---|---|
| 1,459,979 | Kohn | June 26, 1923 |
| 1,819,806 | Allen | Aug. 18, 1931 |
| 2,208,212 | Crowe | July 16, 1940 |

FOREIGN PATENTS

| Number | Country | Date |
|---|---|---|
| 260,690 | Switzerland | Aug. 1, 1949 |